United States Patent
Presz, Jr. et al.

(10) Patent No.: US 8,376,686 B2
(45) Date of Patent: Feb. 19, 2013

(54) WATER TURBINES WITH MIXERS AND EJECTORS

(75) Inventors: Walter M. Presz, Jr., Wilbraham, MA (US); Michael J. Werle, West Hartford, CT (US)

(73) Assignee: FloDesign Wind Turbine Corp., Waltham, MA (US)

( * ) Notice: Subject to any disclaimer, the term of this patent is extended or adjusted under 35 U.S.C. 154(b) by 573 days.

(21) Appl. No.: 12/425,358

(22) Filed: Apr. 16, 2009

(65) Prior Publication Data

US 2009/0263244 A1    Oct. 22, 2009

Related U.S. Application Data

(63) Continuation-in-part of application No. 12/053,695, filed on Mar. 24, 2008.

(60) Provisional application No. 61/124,397, filed on Apr. 16, 2008, provisional application No. 60/919,588, filed on Mar. 23, 2007.

(51) Int. Cl.
*F04D 27/02* (2006.01)
*F03D 7/02* (2006.01)
*F03B 1/00* (2006.01)
*F04D 29/52* (2006.01)

(52) U.S. Cl. ........... 415/1; 415/4.3; 415/4.5; 415/211.2; 415/220; 415/908

(58) Field of Classification Search .................. 415/4.3, 415/4.5, 211.2, 220, 908, 1; 290/908, 55, 290/44
See application file for complete search history.

(56) References Cited

U.S. PATENT DOCUMENTS

| | | | |
|---|---|---|---|
| 1,312,021 A | 8/1919 | Dickinson et al. | |
| 1,476,229 A | 12/1923 | Suess | |
| 3,986,787 A * | 10/1976 | Mouton et al. | 415/7 |
| 4,021,135 A | 5/1977 | Pedersen et al. | |
| 4,075,500 A * | 2/1978 | Oman et al. | 290/55 |
| 4,077,206 A | 3/1978 | Ayyagari | |
| 4,132,499 A | 1/1979 | Igra | |
| 4,140,433 A | 2/1979 | Eckel | |
| 4,166,596 A * | 9/1979 | Mouton et al. | 244/30 |
| 4,204,799 A | 5/1980 | de Geus | |
| 4,219,303 A | 8/1980 | Mouton, Jr. et al. | |

(Continued)

FOREIGN PATENT DOCUMENTS

| | | |
|---|---|---|
| DE | 19626360 A1 | 1/1998 |
| DE | 10036307 A1 | 2/2002 |

(Continued)

OTHER PUBLICATIONS

Stothers et al. (WO 2006029496) reference.*

(Continued)

*Primary Examiner* — Christopher Verdier
*Assistant Examiner* — Su Htay
(74) *Attorney, Agent, or Firm* — McCarter & English, LLP

(57) ABSTRACT

Turbine systems for extracting energy from water traveling relative to the turbine system can include a rotor assembly for extracting the energy, a turbine shroud having a turbine shroud inner volume within which at least a portion of the rotor assembly is disposed, and an ejector shroud disposed adjacent to the turbine shroud. The turbine shroud and the ejector shroud can each have a terminus comprising a plurality of turbine shroud mixer elements or ejector shroud mixer elements, respectively. One or more of the mixer elements and ejector shrouds comprise a mixer/ejector pump which increases the energy extraction potential of the turbine system. One or more of the turbine shroud mixer elements, ejector shroud mixer elements, and ejector shroud and turbine shroud inlets can be asymmetric along a plane passing through the axis of rotation of the rotor assembly.

25 Claims, 22 Drawing Sheets

U.S. PATENT DOCUMENTS

| | | | |
|---|---|---|---|
| 4,302,934 | A | 12/1981 | Wynosky et al. |
| 4,320,304 | A | 3/1982 | Karlsson et al. |
| 4,324,985 | A | 4/1982 | Oman |
| 4,379,236 | A | 4/1983 | Inoue |
| 4,422,820 | A | 12/1983 | Kirsch et al. |
| 4,482,290 | A | 11/1984 | Foreman et al. |
| 4,487,017 | A | 12/1984 | Rodgers |
| 4,516,907 | A | 5/1985 | Edwards |
| 4,543,784 | A | 10/1985 | Kirker |
| 4,548,034 | A | 10/1985 | Maguire |
| 4,600,360 | A | 7/1986 | Quarterman |
| 4,684,316 | A | 8/1987 | Karlsson |
| 4,720,640 | A * | 1/1988 | Anderson et al. ............... 290/43 |
| 4,786,016 | A | 11/1988 | Presz, Jr. et al. |
| 5,083,899 | A | 1/1992 | Koch |
| 5,110,560 | A | 5/1992 | Presz, Jr. et al. |
| 5,230,656 | A | 7/1993 | Paterson et al. |
| 5,440,875 | A * | 8/1995 | Torkelson et al. ........... 60/226.1 |
| 5,447,412 | A | 9/1995 | Lamont |
| 5,761,900 | A * | 6/1998 | Presz, Jr. ..................... 60/262 |
| 5,884,472 | A | 3/1999 | Presz, Jr. et al. |
| 6,082,635 | A | 7/2000 | Seiner et al. |
| 6,168,373 | B1 | 1/2001 | Vauthier |
| 6,233,920 | B1 | 5/2001 | Presz, Jr. et al. |
| 6,276,127 | B1 | 8/2001 | Alberti |
| 6,382,904 | B1 | 5/2002 | Orlov et al. |
| 6,655,907 | B2 | 12/2003 | Brock et al. |
| 6,854,260 | B2 | 2/2005 | Anderson |
| 6,877,960 | B1 | 4/2005 | Presz, Jr. et al. |
| 6,887,031 | B1 | 5/2005 | Tocher |
| 7,017,331 | B2 | 3/2006 | Anderson |
| 7,111,448 | B2 | 9/2006 | Anderson |
| 7,147,428 | B2 | 12/2006 | Lamont |
| 7,218,011 | B2 | 5/2007 | Hiel et al. |
| 7,220,096 | B2 | 5/2007 | Tocher |
| 7,251,927 | B2 | 8/2007 | Anderson |
| 7,256,512 | B1 | 8/2007 | Marquiss |
| 7,434,384 | B2 | 10/2008 | Lord et al. |
| 7,600,963 | B2 | 10/2009 | Miller |
| 7,713,020 | B2 | 5/2010 | Davidson et al. |
| 7,758,300 | B2 | 7/2010 | Friesth |
| 7,762,057 | B2 | 7/2010 | Sloan et al. |
| 7,768,145 | B2 | 8/2010 | Susman et al. |
| 7,836,700 | B2 | 11/2010 | Viswanathan |
| 7,874,788 | B2 | 1/2011 | Stothers et al. |
| 7,944,073 | B2 | 5/2011 | Van Drentham Susman et al. |
| 7,976,268 | B2 | 7/2011 | Presz, Jr. et al. |
| 7,976,269 | B2 | 7/2011 | Presz, Jr. et al. |
| 7,976,270 | B2 | 7/2011 | Presz, Jr. et al. |
| 7,980,811 | B2 | 7/2011 | Presz, Jr. et al. |
| 8,021,100 | B2 | 9/2011 | Presz, Jr. et al. |
| 2004/0156710 | A1 | 8/2004 | Gaskell |
| 2005/0285407 | A1* | 12/2005 | Davis et al. ..................... 290/54 |
| 2006/0151633 | A1 | 7/2006 | Presz et al. |
| 2007/0048086 | A1 | 3/2007 | Thorsbakken |
| 2008/0042445 | A1 | 2/2008 | Stephens |
| 2008/0232957 | A1 | 9/2008 | Presz et al. |
| 2009/0087308 | A2 | 4/2009 | Presz et al. |
| 2009/0214338 | A1* | 8/2009 | Werle et al. ................... 415/220 |
| 2009/0280009 | A1 | 11/2009 | Brock |
| 2010/0310361 | A1 | 12/2010 | Carre |
| 2011/0115228 | A1 | 5/2011 | Stothers et al. |

FOREIGN PATENT DOCUMENTS

| | | |
|---|---|---|
| DE | 101 45 786 A1 | 4/2003 |
| EP | 0045202 A1 | 2/1982 |
| EP | 155087 A2 | 9/1985 |
| EP | 1067286 A1 | 1/2001 |
| GB | 1563337 A | 3/1980 |
| JP | 61043276 A | 3/1986 |
| JP | 63-029063 | 2/1988 |
| JP | 03-037363 A | 2/1991 |
| JP | 05-263713 A | 10/1993 |
| JP | 2002-242812 | 8/2002 |
| JP | 2002-317698 A | 10/2002 |
| JP | 2004052721 A | 2/2004 |
| JP | 2005-502821 | 1/2005 |
| JP | 03138373 | 12/2007 |
| RU | 2124142 C1 | 12/1998 |
| RU | 2147693 C1 | 4/2000 |
| RU | 2205977 C1 | 6/2003 |
| RU | 2230218 C2 | 6/2004 |
| WO | 9741351 A1 | 11/1997 |
| WO | 03025385 A2 | 3/2003 |
| WO | 03081031 A1 | 10/2003 |
| WO | 2004/099607 A2 | 11/2004 |
| WO | 2006-029496 | 3/2006 |
| WO | WO 2006029496 * | 3/2006 |
| WO | 2007/107505 A1 | 9/2007 |
| WO | 2008043367 A1 | 4/2008 |
| WO | 2008118405 A2 | 10/2008 |
| WO | 2009095149 A2 | 8/2009 |

OTHER PUBLICATIONS

PCT Notification of Transmittal of the International Search Report and the Written Opinion of the International Searching Authority, or the Declaration, dated Aug. 28, 2009, issued in connection with related PCT application PCT/US2009/040874.

Presz Jr., W. & M. Werle, "Multi-Stage Mixer/Ejector Systems," 38th AIAA/ASMA/SAE/ ASEE Joint Propulsion Converence & Exhibit, AIAA 2002-4064, Jul. 7, 2002.

Werle M.J. & Presz Jr., W. M., "Ducted Wind/Water Turbines and Propellers Revisited," Journal of Propulsion and Power, vol. 24, No. 5 (2008), 1146-1150.

Extended European Search Report dated May 25, 2012 for EP Application No. 09733347.

Office Action for related Japanese Application No. 2011-505215 dated Jul. 26, 2012.

* cited by examiner

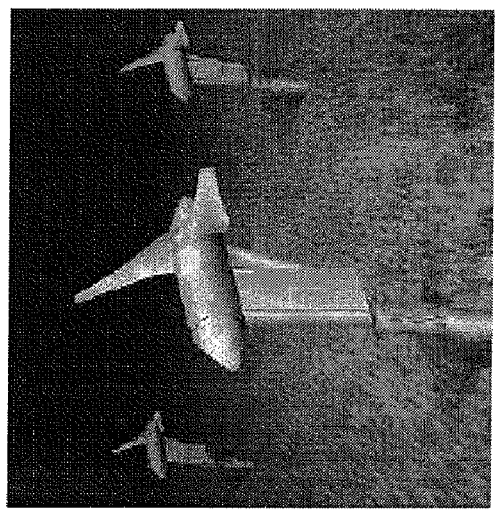
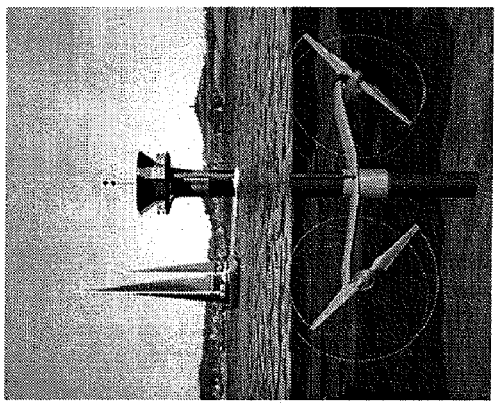
PRIOR ART
FIGURE 1A

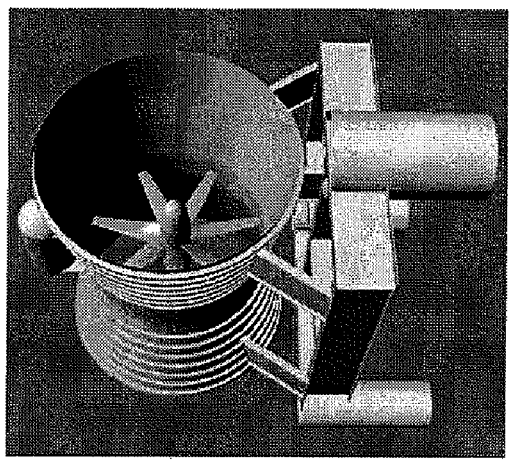
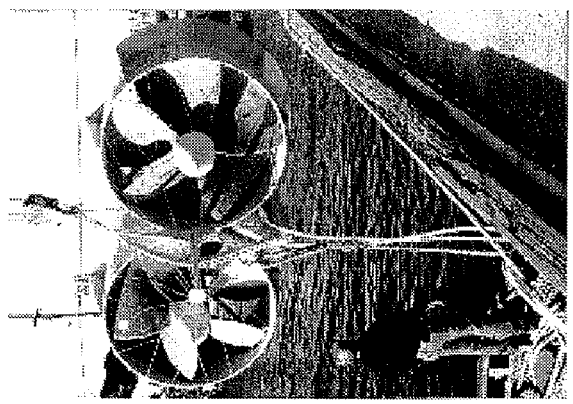
PRIOR ART
FIGURE 1B

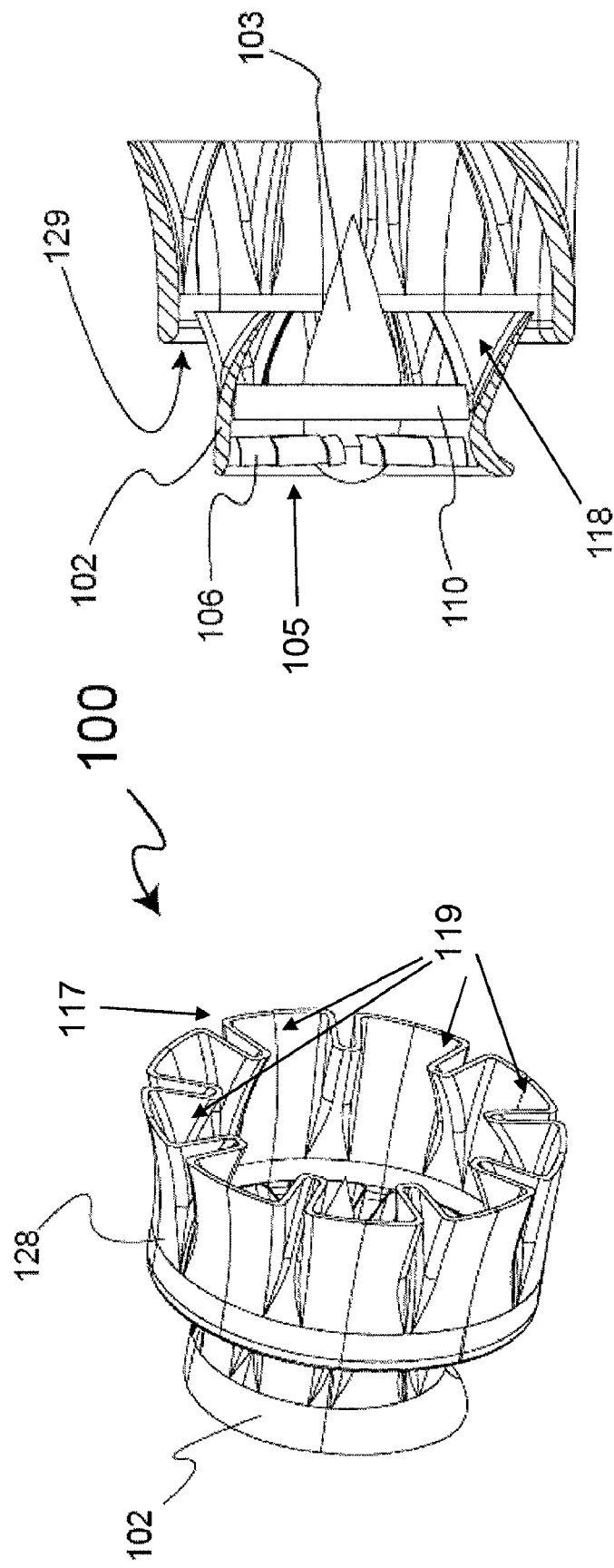

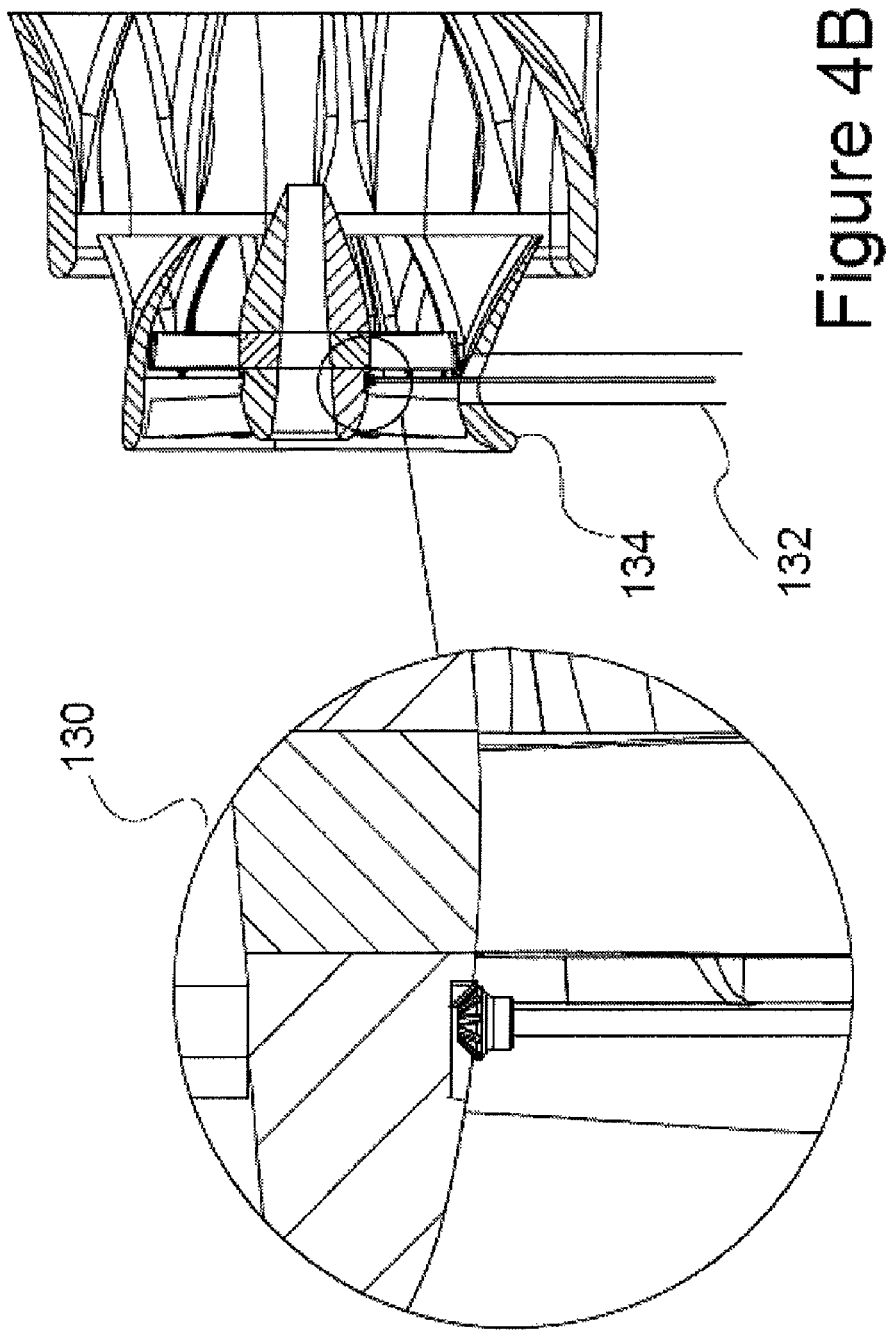

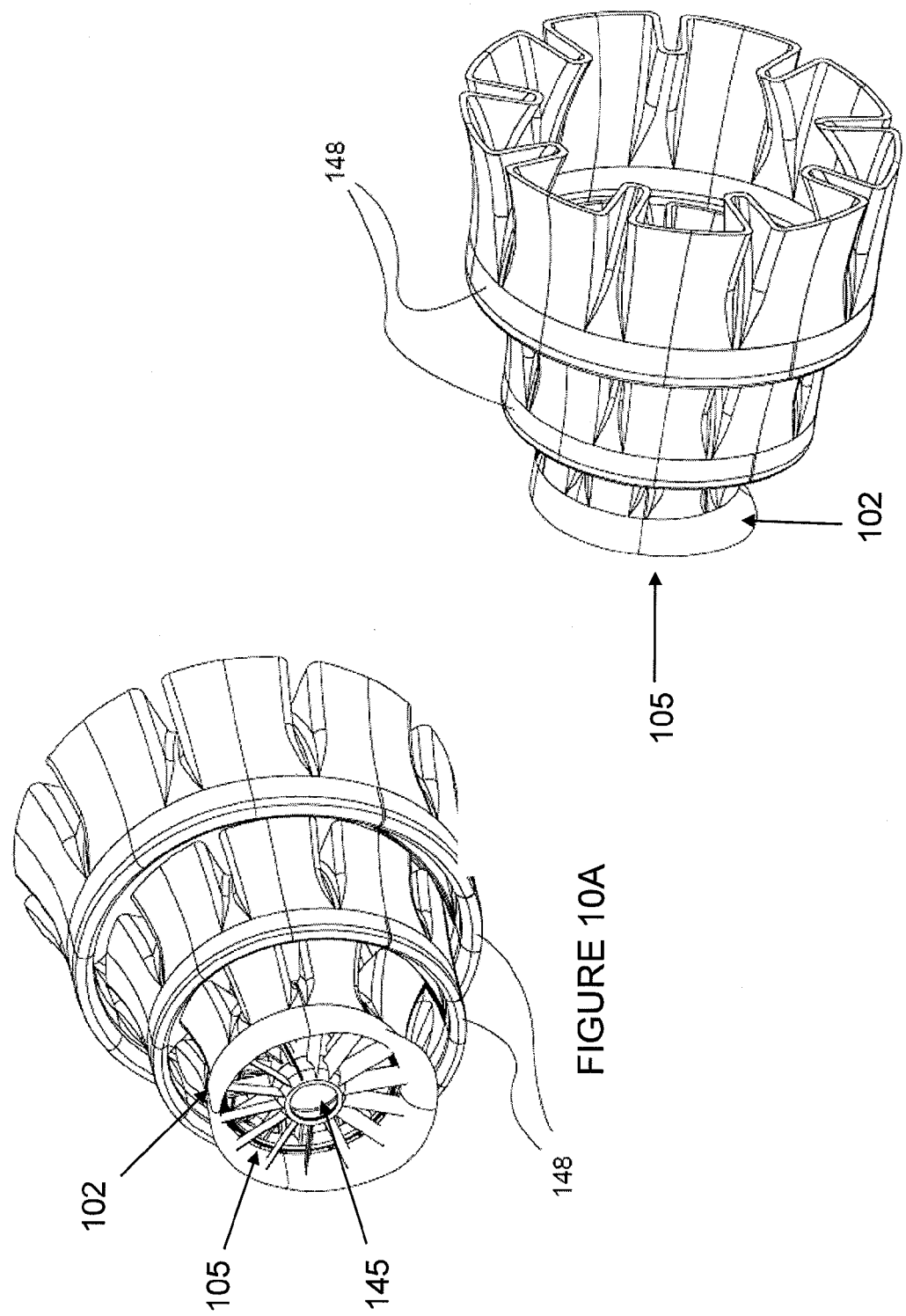

WATER TURBINES WITH MIXERS AND EJECTORS

CROSS-REFERENCE TO RELATED APPLICATION

This application claims the benefit of U.S. provisional patent application Ser. No. 61/124,397, filed on Apr. 16, 2008 and entitled "Water Turbines with Mixers and Ejectors," This application is also a continuation-in-part of co-pending application for U.S. patent Ser. No. 12/053,695, filed on Mar. 24, 2008 and entitled "Propeller Propulsion Systems Using Mixer Ejectors" which claims the benefit of and incorporates by reference U.S. provisional patent application Ser. No. 60/919,588, filed on Mar. 23, 2007 and entitled, "Mixer-Ejector Power/Propulsion System." The disclosures of the applications from which the current applications derives a priority right are incorporated by reference herein in their entireties.

FIELD

The instant subject matter relates to axial flow turbine and ejector systems, such as for example, those used to extract energy when immersed in a flowing water stream, such as that of an ocean-current, tidal-current, river/stream current and other fluid currents.

BACKGROUND

Axial flow water turbine systems that extract energy from flowing water are referred to herein as "current turbines." Current turbines usually contain a propeller-like device or "rotor," that is directed to receive a moving stream of water. As depicted in FIG. 1, a rotor can be either unshrouded or contained in a shroud. As the current hits the rotor, the current produces a force on the rotor in such a manner as to cause the rotor to rotate about its center. The rotor can be connected to either an electric generator or mechanical device through linkages such as gears, belts, chains or other means. Such turbines can be used for generating electricity and/or to drive rotating pumps or moving machine parts. They may also be used in large electricity generating "current turbine farms" (also termed "current turbine arrays") containing multiple such turbines in a geometric pattern designed to allow maximum power extraction with minimal impact of each such turbine on one another and/or the surrounding environment.

The ability of an unshrouded rotor to convert fluid power to rotating power, when placed in a stream of width and depth larger than its diameter, is limited by the well documented theoretical value of 59.3% of the oncoming stream's power, known as the "Betz" limit which was documented by A. Betz in 1926. This productivity limit applies especially to the traditional multi-bladed axial current and tidal turbines shown in FIG. 1A. Attempts have been made to try to increase current turbine performance potential beyond the "Betz" limit. Properly designed shrouds can cause the oncoming flow to speed up as it approaches the rotor compared to what is experienced by an unshrouded rotor. The oncoming flow is thereby concentrated into the center of the duct. In general, for a properly designed rotor, this increased flow speed over that of an unshrouded rotor causes more force on the rotor and subsequently higher levels of power extraction than the same size unshrouded rotor. Previous shrouded current turbines such as those shown in FIG. 1B have employed entrance concentrators and exit diffusers to increase the flow velocities at the turbine rotor. Diffusers, which typically include a pipe-like structure with openings along the axial length to allow slow, diffusive mixing of water inside the pipe with that outside the pipe, generally require long lengths for good performance, and tend to be very sensitive to oncoming flow variations. Such long, flow sensitive diffusers are impractical in many installations. Short diffusers can stall and thereby reduce the energy conversion efficiency of the system.

SUMMARY

In a first implementation, a turbine system for extracting energy from water traveling relative to the turbine system in an incoming current flow direction has an inlet end adapted to be directed into the incoming current flow direction and an outlet end opposite the inlet end. The water has a non-uniform flow velocity distribution across the inlet end of the turbine system. The turbine system includes a rotor assembly, a turbine shroud having a turbine shroud inner volume within which at least a portion of the rotor assembly is disposed, and an ejector shroud having a ejector shroud inner volume within which at least a portion of the turbine shroud is disposed. The rotor assembly is axially symmetric about an axis of rotation and has an upstream rotor face oriented toward the inlet end. The turbine shroud includes a turbine shroud inlet disposed nearer the inlet end than the rotor face and a turbine shroud terminus disposed nearer the outlet end than the rotor assembly. The turbine shroud terminus includes a plurality of turbine shroud mixer elements. The turbine shroud inlet is adapted to direct a first volume of water moving in the incoming current flow direction to the rotor assembly such that the first volume causes the rotor assembly to spin and to extract energy from the first volume of water before the first volume of water at a lower energy is discharged from the turbine shroud into the ejector shroud via the turbine shroud terminus. The ejector shroud includes an ejector shroud inlet and an ejector shroud terminus. The ejector shroud inlet is asymmetric about the plane passing through the axis of rotation such that it has greater cross-sectional area on a lower velocity side of a plane passing through the axis of rotation than on a higher velocity side of the plane passing through the axis of rotation. The ejector shroud terminus extends in the current flow direction beyond the turbine shroud mixer elements.

In a second interrelated implementation, a turbine system includes a rotor assembly that is axially symmetric about an axis of rotation and that has an upstream rotor face oriented toward the inlet end, a turbine shroud having a turbine shroud inner volume within which at least a portion of the rotor assembly is disposed, and an ejector shroud having a ejector shroud inner volume within which at least a portion of the turbine shroud is disposed. The turbine shroud includes a turbine shroud inlet disposed nearer the inlet end than the rotor face and a turbine shroud terminus disposed nearer the outlet end than the rotor assembly. The turbine shroud terminus includes a plurality of turbine shroud mixer elements that are asymmetric about a plane passing through the axis of rotation such that at least one of the turbine shroud mixer elements on a lower velocity side of the plane passing through the axis of rotation is larger than at least one of the turbine shroud mixer elements on a higher velocity side of the plane passing through the axis of rotation. The turbine shroud inlet is adapted to direct a first volume of water moving in the incoming current flow direction to the rotor assembly such that the first volume causes the rotor assembly to spin and to extract energy from the first volume of water before the first volume of water at a lower energy is discharged from the turbine shroud via the turbine shroud terminus. The ejector shroud includes an ejector shroud inlet and an ejector shroud terminus extending in the current flow direction beyond the turbine shroud mixer elements.

In a third interrelated implementation, a method of extracting energy from water traveling relative to a turbine system in a current flow direction includes capturing a first volume of the water into a turbine shroud having a turbine shroud inner volume within which at least a portion of a rotor assembly is disposed, directing the first volume of water through the rotor assembly such that the rotor assembly extracts energy from the first volume of water before the first volume of water at a lower energy is discharged from the turbine shroud via the turbine shroud terminus, capturing a second volume of the water into an ejector shroud having a ejector shroud inner volume within which at least a portion of the turbine shroud is disposed, and mixing the first and the second volumes into a mixed volume before discharge of the mixed volume from the ejector shroud terminus. The turbine shroud includes a turbine shroud inlet disposed nearer the inlet end than the rotor assembly and a turbine shroud terminus disposed nearer the outlet end than the rotor assembly. The turbine shroud terminus includes a plurality of turbine shroud mixer elements. The ejector shroud includes an ejector shroud inlet and an ejector shroud terminus. The ejector shroud terminus extends in the current flow direction beyond the turbine shroud mixer elements.

One or more additional optional variations and features can be included in a given implementation of the instant subject matter. The ejector shroud mixer elements and turbine shroud mixer elements can be specifically designed to form a mixer/ejector pump which increases the energy extraction potential of the system by both increasing the flowrate through the turbine rotor and by mixing the low energy turbine shroud exit flow with bypass flow that enters the ejector shroud inlet without passing through the turbine rotor. The ejector shroud inlet can be adapted to direct a second volume of water moving in the current flow direction into the ejector shroud inner volume, and the ejector shroud interior volume can include a plurality of ejector shroud mixer elements that cause the first volume of water to mix with the second volume of water before exiting through the ejector shroud terminus. The turbine shroud and the ejector shroud shapes can minimize a velocity gradient presented to the rotor face, maximize the first volume of water, and maximize mixing of the first and the second volumes before discharge from the ejector shroud terminus. The velocity gradient is measured along the rotor face.

A center body about which the rotor assembly rotates can be included. The turbine shroud can include a stator assembly that includes stator vanes arrayed axially about the center body. The stator vanes can be rotatable to adjust the first volume by increasing or decreasing the open flow area presented to the incoming current flow direction. The turbine shroud inlet can include one or more movable door elements that are operable to increase or reduce the first volume flowing through the rotor assembly. A deflector shaped to inertially separate suspended debris and/or aquatic debris from the first volume prior to the first volume encountering the rotor face can be positioned ahead of the center body. The center body can include a downstream end projecting from the center body toward the turbine shroud terminus and into the ejector shroud. The center body can include a central hollow cavity adapted to allow suspended aquatic debris and/or aquatic life to pass through the center body toward the turbine shroud terminus without encountering the rotor blades. The central hollow cavity, which can optionally include mixer elements at its trailing edge, can also pass high energy bypass flow to the ejector shroud to enhance mixing performance in the ejector shroud. The downstream end can include one or more center body mixer elements. Flow through the hollow center body with downstream mixer elements can enhance the performance of the mixer/ejector pump operation.

The turbine shroud inlet can have a non-circular cross-section that has greater cross-sectional area on the lower velocity side of the plane passing through the axis of rotation than on the higher velocity side of the plane passing through the axis of rotation. The turbine shroud mixer elements can include one or more of mixer lobes and mixer slots. The rotor assembly can include a rotor hub, an outer rotor ring, and a first plurality of radially oriented rotor blades disposed between the hub. The ejector shroud terminus region can include a second plurality of ejector shroud mixer elements that can include one or more of mixer lobes and mixer slots.

The plurality of ejector shroud mixer elements can be asymmetrical about the plane passing through the axis of rotation. For example, one or more of the ejector shroud mixer elements on the lower velocity side of the plane passing through the axis of rotation can be larger than one or more of the ejector shroud mixer elements on the higher velocity side of the plane passing through the axis of rotation. Similarly, the plurality of turbine shroud mixer elements can be asymmetrical about the plane passing through the axis of rotation, one or more of the turbine shroud mixer elements on the lower velocity side of the plane passing through the axis of rotation being larger than one or more of the turbine shroud mixer elements on the higher velocity side of the plane passing through the axis of rotation.

A second ejector shroud having a second ejector shroud inner volume within which at least a portion of the ejector shroud is disposed can be included. The second ejector shroud can include a second ejector shroud inlet and a second ejector shroud terminus region. The second ejector shroud inlet can be asymmetrical about the plane passing through the axis of rotation such that it has greater cross-sectional area on a lower velocity side of the plane passing through the axis of rotation than on the higher velocity side of the plane passing through the axis of rotation, the second ejector shroud terminus extending in the current flow direction beyond the ejector shroud mixer elements.

The instant subject matter can provide many advantages. For example current turbines are conceptually similar to wind turbines but differ in detail in order to mitigate water-borne complications, such as: forces approximately 900 times greater than those encountered by wind turbines, significant buoyancy induced vertical forces, damaging asymmetrical/unsteady loads due to significant vertical variation in the incoming velocity field caused by the close proximity of a fixed surface such as a basin floor or wall or the hull of a ship, barge, or other waterborne craft to which the current turbine is secured. Sediment scouring can also occur fore and aft of the current turbine due to flow velocity profile disruptions caused by lower energy water exiting the turbine and remixing with current flow that bypasses the turbine inlet or inlets. Aquatic life safety, water corrosion and fouling avoidance systems, and floating debris management can also preset important challenges for the efficient use of a current turbine. These demands typically require use of stronger, heavier, and water resistant materials, different supporting mechanisms and internal structure, different aero/hydrodynamic shaping and careful management of the water flow fore and aft of the current turbine. All of these factors can add significantly to expenses incurred per generated energy unit.

Various features of the current turbines according to the instant subject matter can advantageously address many of these challenges. For example, an ejector shroud can be provided that encompasses a turbine shroud housing the rotor assembly. A second water volume flowing into the ejector shroud bypasses the turbine shroud and therefore does not have energy extracted. This second water volume is actively mixed with a first water volume after the first volume has passed through the rotor assembly and had energy extracted. The mixing occurs within the ejector shroud and prior to discharge out the terminus of the ejector shroud.

First-principles-based theoretical analysis of the current turbines as described herein indicate: that they are capable of producing three or more time the power of currently available un-shrouded turbines for the same rotor frontal area. The instantly disclosed current turbines can increase the productivity of current and tidal farms by a factor of two or more.

The details of one or more variations of the instant subject matter are set forth in the accompanying drawings and the description below. Other features and advantages of the instant subject matter will be apparent from the description and drawings, and from the claims.

DESCRIPTION OF DRAWINGS

The accompanying drawings, which are incorporated in and constitute a part of this specification, show certain aspects of the instant subject matter and, together with the description, help explain some of the principles associated with the disclosed embodiments and implementations. In the drawings, FIGS. 1A, 1B, and 1C are schematic diagrams illustrating examples of current turbine systems;

FIGS. 2A, 2B, 2C, and 2D are schematic diagrams illustrating multiple views of an implementation of a current turbine system;

FIGS. 4A and 4B are schematic diagrams illustrating front perspective views of a current turbine system with a stator-rotor turbine and with portions broken away to show interior structure, such as a power takeoff in the form of a wheel-like structure attached to the outer rim of the rotor and power take-off to a ring generator at the rotor inner ring;

FIGS. 10A and 10B are schematic diagrams illustrating an alternate implementations of a water turbine system of a current turbine system with a two stage mixer/ejector system.

DETAILED DESCRIPTION

Gas turbine concepts and technology have yet to be applied commercially to axial flow current turbines. Most existing current turbines use a single multibladed rotor based on propulsive propeller concepts to extract the current energy. As a result, a significant amount of the flow passing through the current turbine blades converts some of the flow energy into swirling flow about the axis. This swirl component absorbs energy that cannot be delivered to the generator plus it induces flow rotation in the wake of the system that can induce current bed scouring, sediment stirring and aquatic life disorientation. These effects can be mitigated and even eliminated using mature gas turbine stator/rotor turbine aero/hydrodynamic flow considerations. Gas turbine rotor/stator design approaches can be applied to current turbines to essentially eliminate the detrimental effects of exit-flow swirl on the environment aft of the turbine.

Figure 1C:
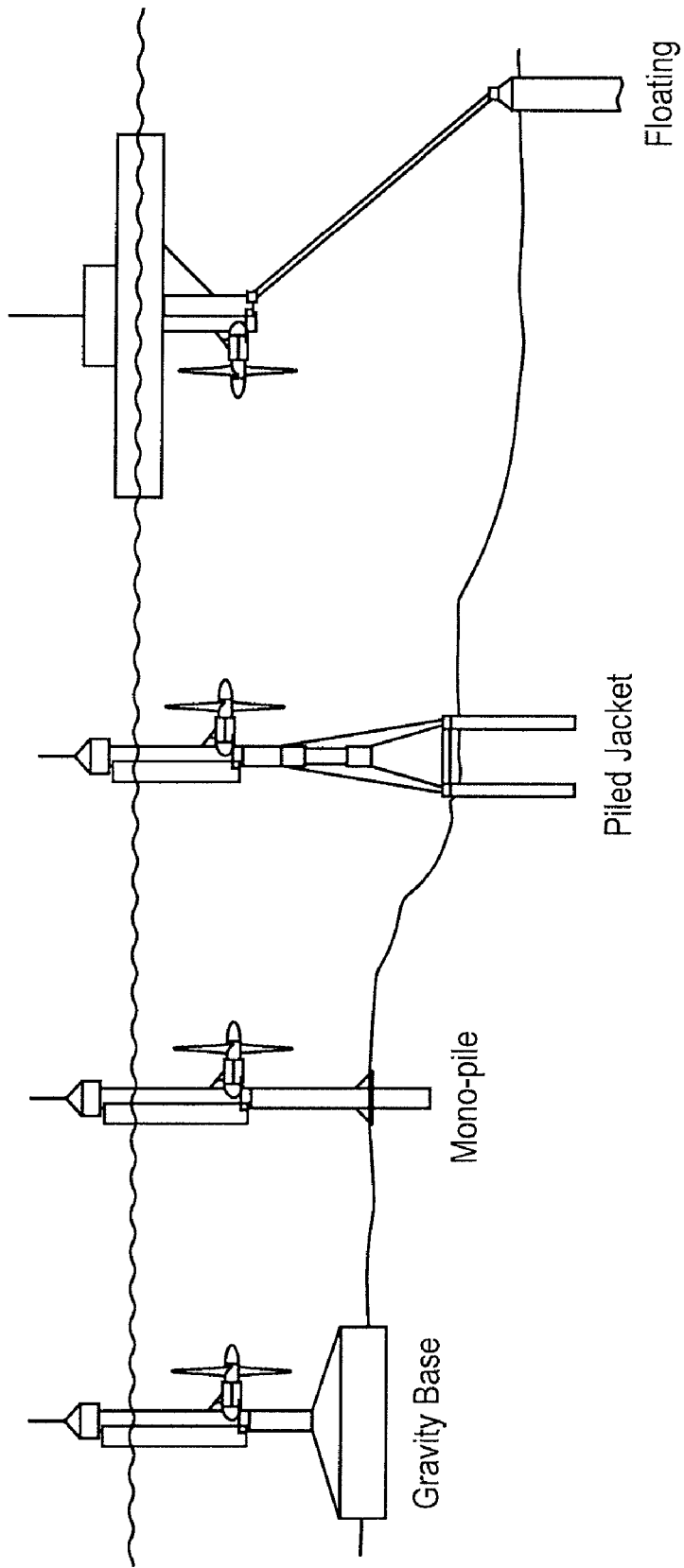

Additionally, traditional single rotor systems, such as depicted in FIG. 1A, are delayed in rotational start-up and thus energy production until the local axial velocity level is high enough to induce positive aero/hydrodynamic lift and torque on the rotor airfoil. Properly designed inlet stator/rotor systems according to the instant subject matter do not have this limitation and are therefore capable of inducing torque on the rotor and producing power for all local velocities levels above zero. Also, previous shrouded current turbines have failed to account for aero/hydrodynamic efficiency of the flow around the exterior of the shroud, especially in the presence of a free surface, basin floor or sidewall, or the hull of a watercraft. Adaptation of current turbine inlets to manage debris and/or aquatic life approaching the inlet is also an optional feature of the instant subject matter. An aerodynamically or hydrodynamically tailored bulbous shape can be positioned in front of the inlet to first deflect the incoming water and any suspended debris contents outward. The water current stream has lower inertia than larger suspended debris and/or aquatic life and therefore can follow the contour of the bulbous shape to enter the turbine shroud or the ejector shroud. Higher inertia suspended objects, such as aquatic animals, debris, and the like deviate from the water stream lines and therefore fail to enter the turbine shroud or the ejector shroud.

To achieve increased power and efficiency in currents, it is generally necessary to closely tailor the aero/hydrodynamic designs of the shroud and rotor to the vertically varying velocity profile approaching the turbine. Velocity profiles generally follow a $1/10^{th}$ power-law dependency between minimum and maximum levels, which usually, but not always occur at the current bed and free surface respectively. While wind turbines encounter a similar vertical variation, it is not nearly as severe as the current turbine case because a wind turbine is of miniscule vertical scale compared to the earth's atmosphere height. Water is approximately 900 times more dense than air. Because the power generated depends on the density of the fluid and the cube of the local velocity while the axial force depends on the density and square of the velocity, this level of variation causes significant asymmetric power delivery and structural loads on the rotor as well as shroud system unless controlled by the aero/hydrodynamic design. Whereas wind turbines are generally symmetric about their center axis of rotation, shrouded current turbines provide the opportunity to employ asymmetric features to control and mitigate incoming velocity profile induced complications. In particular, although the interior surface of the shroud must necessarily be near-circular where it surrounds the rotor, this limitation does not apply to the remainder of the shroud geometry, either internally or externally. Thus, aero/hydrodynamic contour variation around the circumference of the shroud can be used to reduce the distortion of the incoming flow to an acceptable level by the time it reaches the rotor face. Further, such asymmetric or ovalated aero/hydrodynamic contouring can reduce the impact of the flow exiting the system on the surrounding environment by reducing scouring and sediment stirring of the current basin and walls.

Ejectors draw flow into a system and thereby increase the flow rate through that system. By using ring airfoil concepts in the design of the multiple shrouds of an ejector, the rotor size required for a desired power output level can be reduced to as much as a half or less than that imposed on an unshrouded rotor. Shorter rotor blades are less costly and structurally more robust. Further, the axial forces imposed on the rotor by the current can also be reduced by a half or more while the remaining loads are shifted to the non-rotating elements of the shrouded system. Load carrying by static, non-rotating parts are vastly simpler and economical to design, manufacture and maintain.

Mixer/ejectors are short compact versions of ejector jet pumps that are relatively insensitive to incoming flow distortions and have been used extensively in high speed jet propulsion applications involving flow velocities near or above the speed of sound. See, for example, U.S. Pat. No. 5,761,900 by one of the inventors, Dr. Walter M. Presz, Jr, which also uses a mixer downstream to increase thrust while reducing noise from the discharge. In all previous power generation applications of mixer/ejector technology, including those for wind turbines designed by the inventors, the multiple three dimensional surfaces that induce the flow mixing between two streams, herein after termed the mixing elements, are all the same size and arrayed in a repeating pattern around the circumference of a shroud. To accommodate the velocity distortion embedded in the flow approaching a current turbine and to work efficiently within the attendant ovalated shroud inlets, advanced mixing element design can be employed to affect maximum mixing and pumping for each circumferential sector of the system.

Current turbines, like wind turbines, must be able to adjust the power output to be compatible with the rated power level of the generator. Traditional three bladed wind turbines can experience wind speeds from up to 10 times their average operating wind speed and must incorporate a complicated mechanical shut down system to avoid damage to the generator and/or the structure. Current turbines experience less extreme velocity variations and thus typically incorporate differently designed shut down systems. Multi-shrouded mixer/ejector current turbines employing stator/rotor systems offer three means of affecting shut down in addition to a standard breaking system. The stators can be articulated to essentially shut the inlet opening, blocker doors, built into the inner surfaces of the shrouds, can be swung into the flow field thereby obstructing flow passage, and/or an inlet debris blockage bulb can be moved into the inlet to reduce the flow rate.

Anchoring systems for shrouded current turbines are very different than the tall towers used for wind turbines and, as such, they must be integrally designed to avoid compromising the aero/hydrodynamic efficiency of the tightly coupled system. Systems on poles or on platforms such as shown in FIG. 1 will encounter different levels and sources of aero/hydrodynamic interference that must be reduced to assure efficient delivery of energy.

Multi-shrouded mixer/ejector current turbines provide the opportunities for unique integration of the rotor and generator systems. Because current turbines are not required to change direction or, for the tidal case only do so on a twice a day schedule, the generator can be more conveniently placed for efficiency and/or easier maintenance servicing. Employing rotor tip shrouds, as frequently employed in gas turbines, allows use of a rim gear/drive system and placement of the generator in or on the shroud. Additionally, it allows the center body to be designed as an open conduit for aquatic to pass through.

Figure 5A:
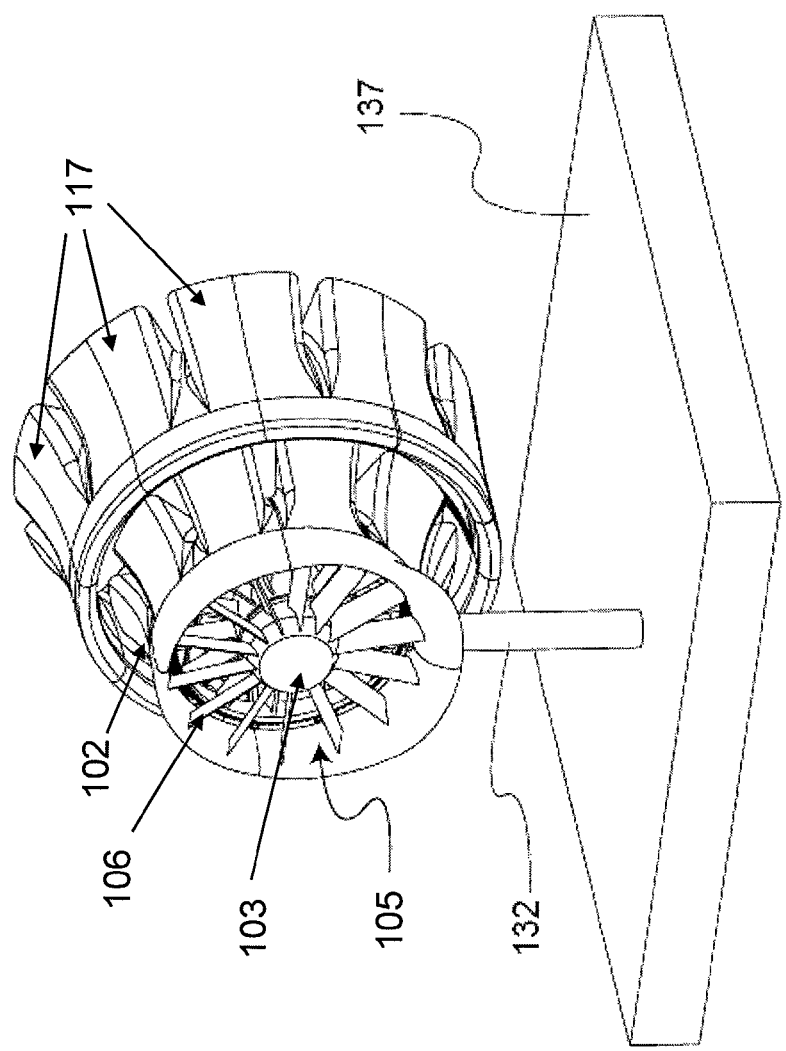
FIGS. 5A, 5B, 5C, and 5D are schematic diagrams illustrating optional installations of current turbine systems.
Figure 5C:
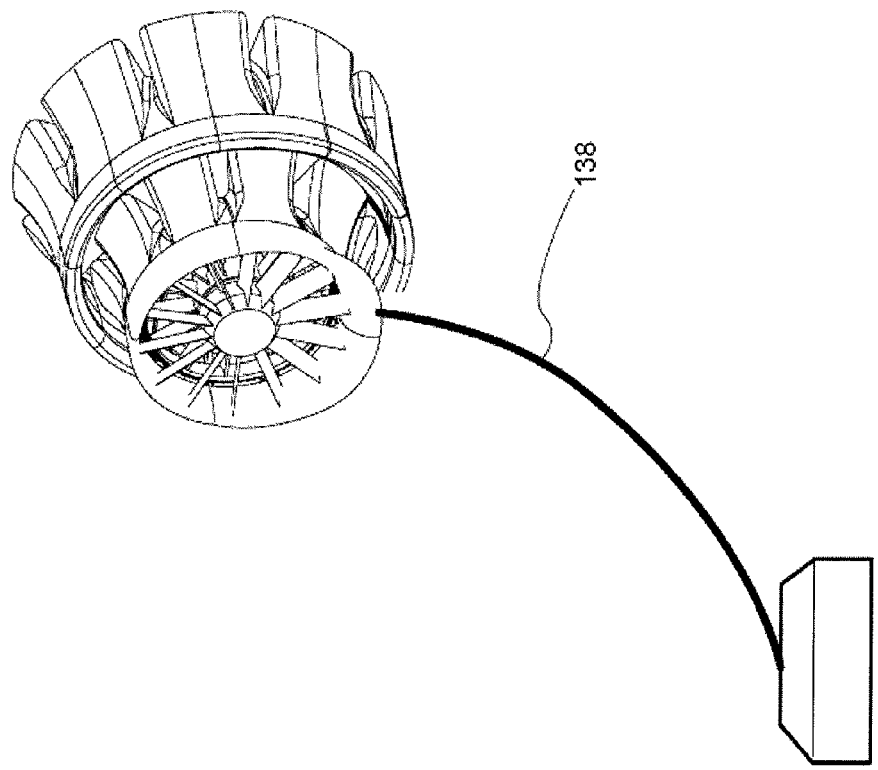
Figure 5B:
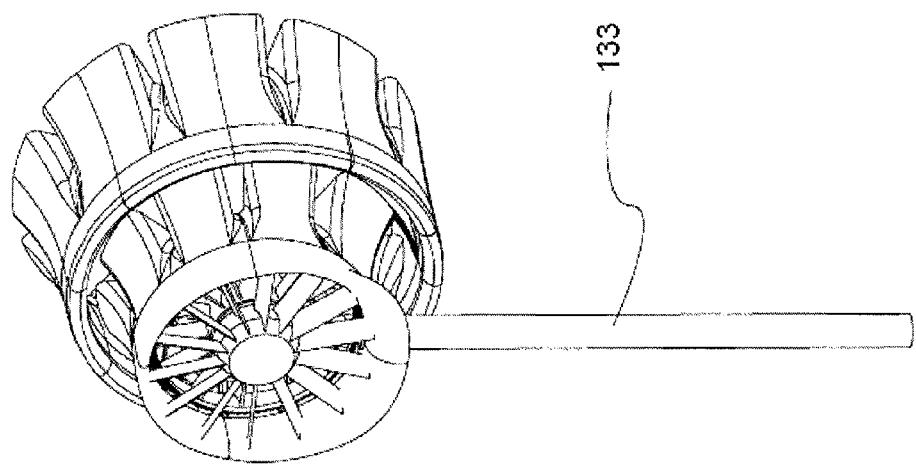
Figure 5D:
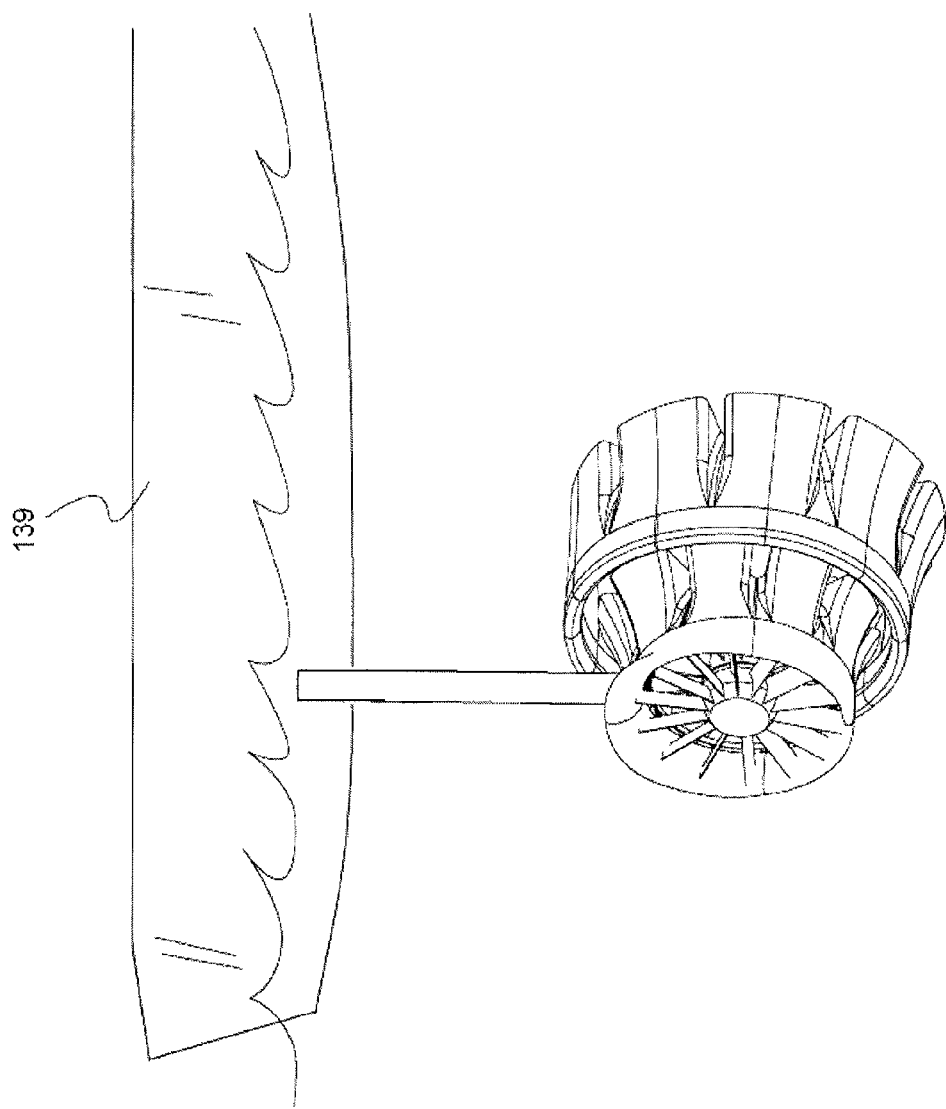
Figure 6:
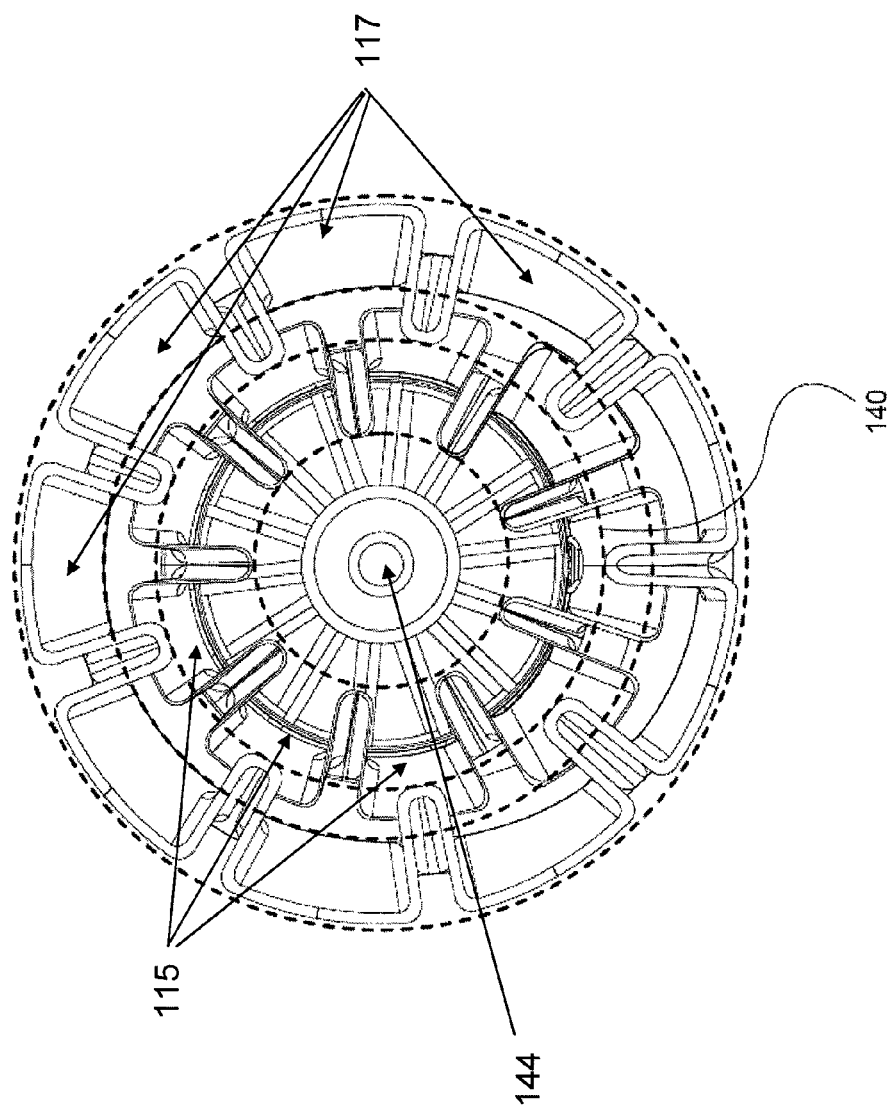
FIG. 6 is a schematic diagram illustrating an alternate implementation of a current turbine system with a mixer/ejector pump having mixer lobes that vary in shape and size around the circumference on the terminus regions of the turbine shroud and ejector shroud.

FIGS. 2-10 show a number of implementations that illustrate some of the features that are within the scope of the current subject matter. According to one implementation, a water turbine system includes an aerodynamically or hydrodynamically contoured turbine shroud 102 is noncircular at some points along its axial extent. An aerodynamically or hydrodynamically contoured center body 103 is enclosed within and attached to the turbine shroud 102 that has a turbine shroud inlet 105 through which a first volume of water is drawn. The center body 103 is axially symmetric about a rotor axis of rotation. A turbine stage 104 surrounds the center body 103 and includes a stator ring 106 of stator vanes 108a and an impeller or rotor 110 having impeller or rotor blades 112a. The rotor 110 includes a rotor face formed by the leading edge of the rotor blades 112a. The rotor 110 is positioned downstream from the stator vanes 108a such that the rotor face is substantially aligned with trailing edges of the stator vanes 108a. The stator vanes 108a are mounted on the center body 103, and the rotor blades 112a are attached and held together by inner and outer rings or hoops or alternatively by a hub 112b and an outer ring 112c. The inner ring or hub encircles and is rotatable about the center body 103. A terminus region of mixer element that includes a terminus region or end portion of the turbine shroud 102 includes a ring of mixer lobes 120a that extend downstream beyond the rotor blades 112a and vary in shape or size as needed to fill the gap between the turbine shroud 102 and ejector shroud 128 and deliver ingested water to the vicinity of the center body 103. This is similar to the ejector lobes shown in U.S. Pat. No. 5,761,900, wherein the mixer lobes 120a extend downstream and into an inlet 129 of the ejector shroud 128. The ejector 122 also includes a shroud 128 that can be noncircular for portions of its axial length and that surrounds the ring of mixer lobes 120a on the turbine shroud. The ejector shroud 128 can include mixer elements of varying sizes and shapes in its terminus region as shown in FIG. 6.

Figure 2A:
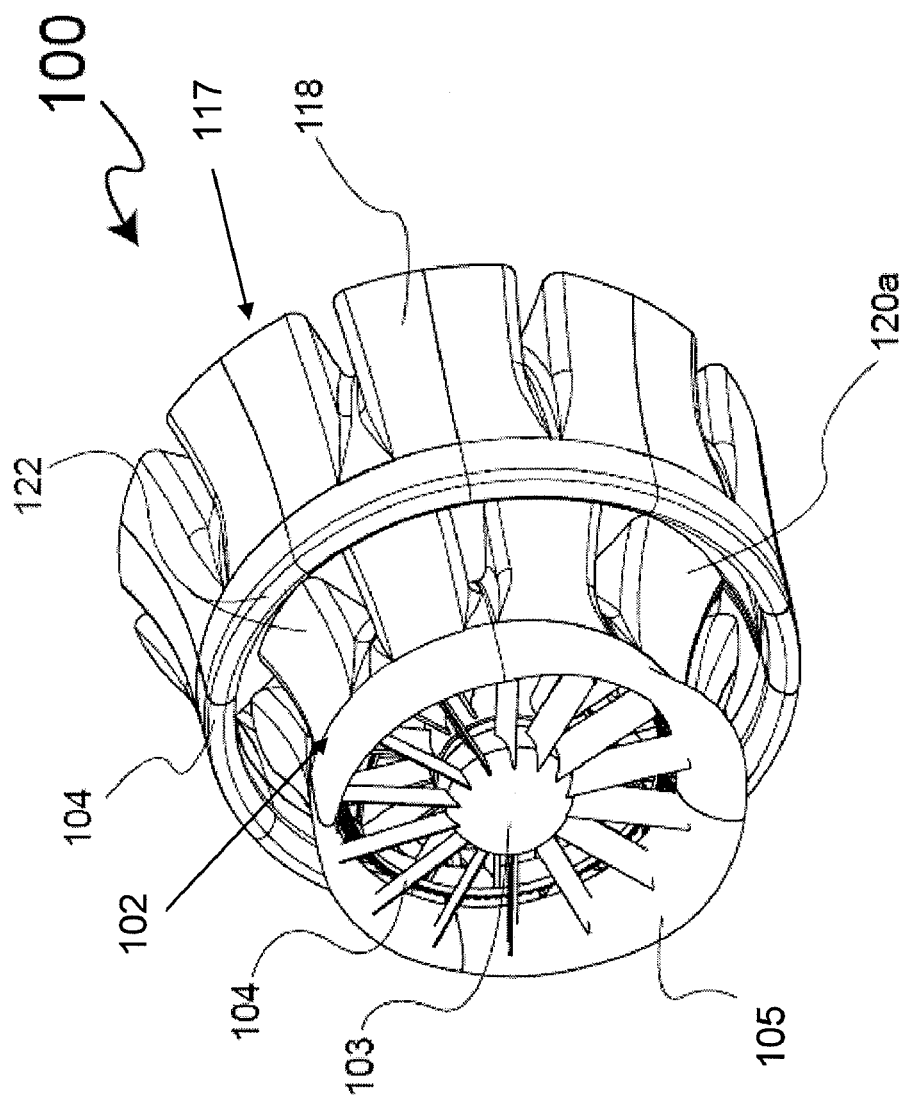
Figure 2D:
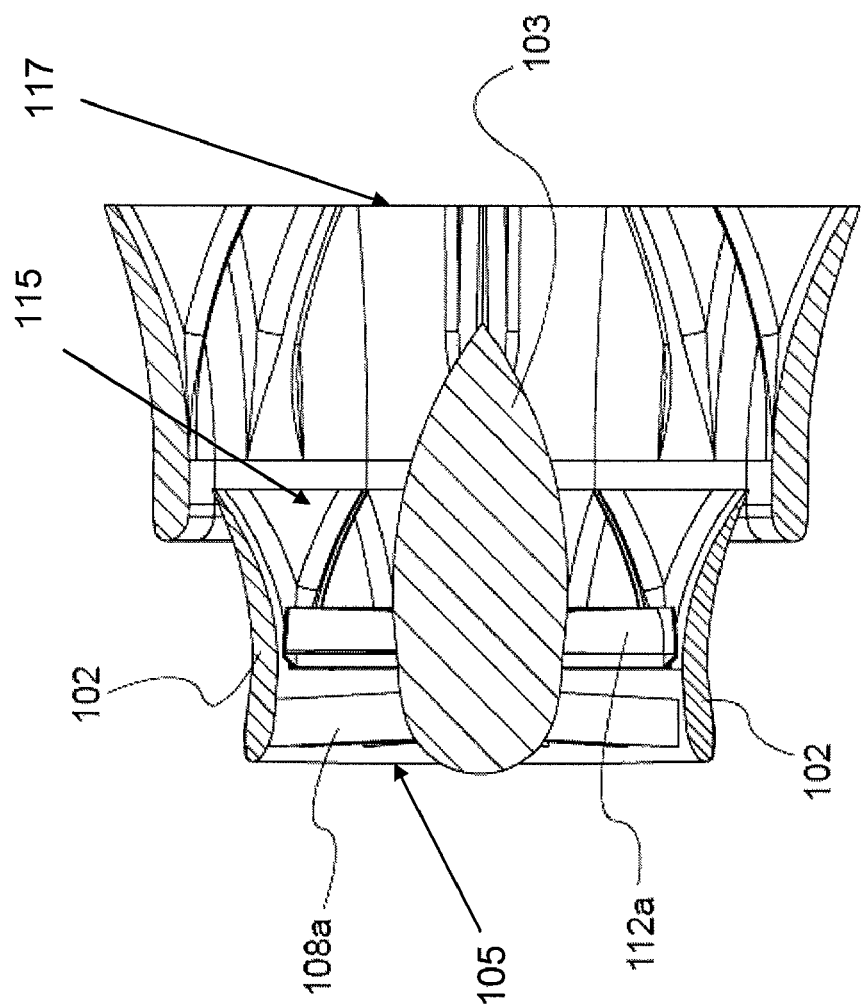
Figure 3A:
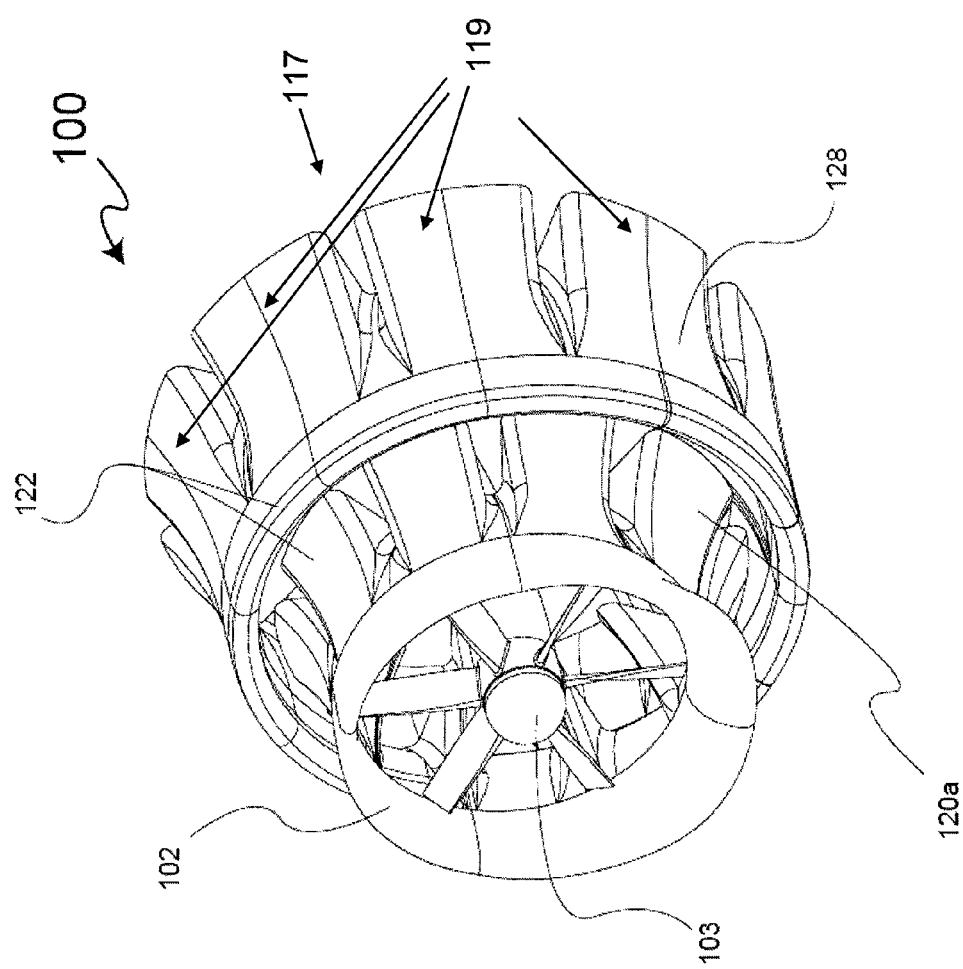
FIG. 3A and FIG. 3B are schematic diagrams illustrating a front perspective view of a current turbine system having one six-bladed rotor.
Figure 3B:
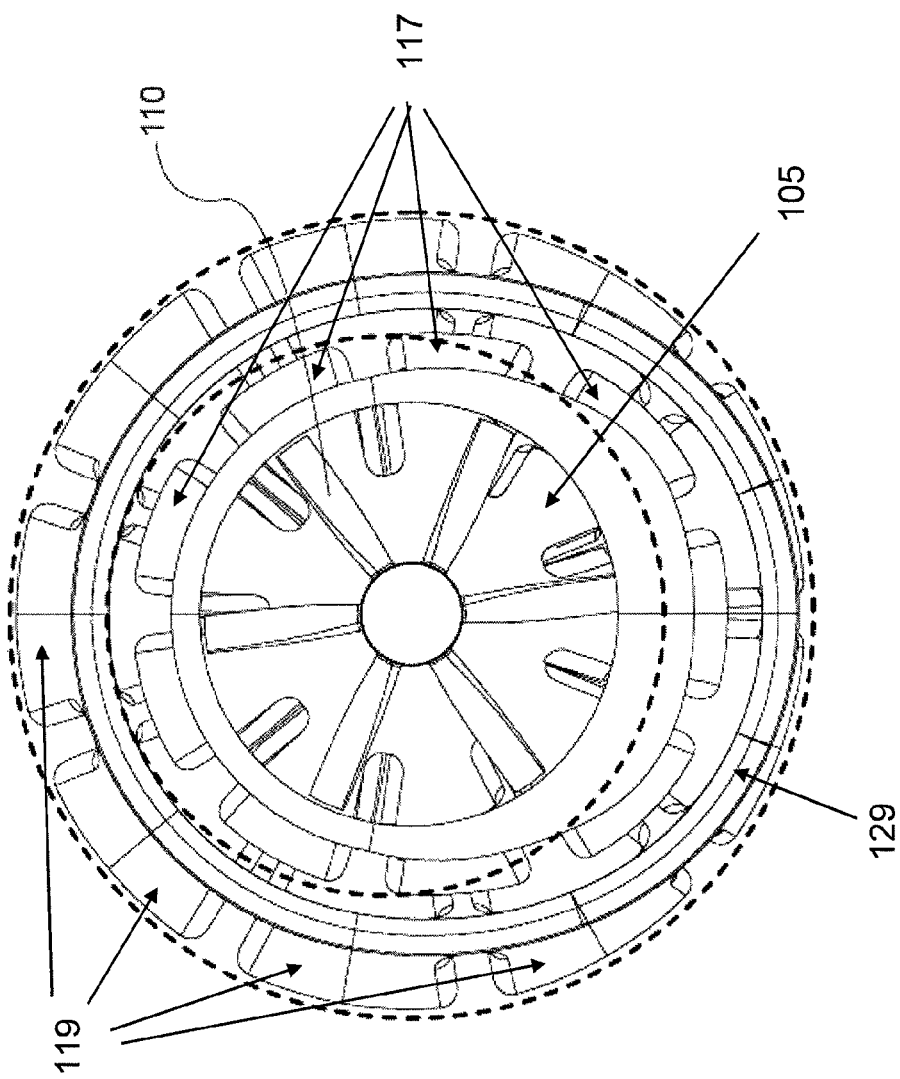

The center body 103, as shown in FIG. 2, can be connected to the turbine shroud 102 through the stator ring 106 (or other means) to eliminate the damaging, annoying and long distance propagating low-frequency pressure waves produced by traditional current and tidal turbines as the turbine's blade wakes strike the support tower. The aerodynamic profiles of the turbine shroud 102 and ejector shroud 128 preferably are aerodynamically cambered to increase flow through the turbine rotor in such a way as to reduce the vertical variation in the velocity at the rotor face induced by upstream distortions.

Applicants have calculated that, for optimum efficiency in the preferred embodiment 100, the area ratio of the ejector pump 122, as defined by the cross sectional area of the ejector shroud terminus divided by the cross sectional area of the turbine shroud terminus will be between 1.5 and 4.0. The number of mixer lobes 120a would be between 6 and 14. Each lobe will have inner and outer trailing edge angles between 5 and 25 degrees. The primary lobe exit location will be at, or near, the entrance location or inlet 129 of the ejector shroud 128. The height-to-width ratio of the lobe channels will be between 0.5 and 4.5. The mixer penetration will be between 30% and 80%. The center body 103 plug trailing edge angles will be thirty degrees or less. The length to diameter (L/D) of the overall system 100 will be between 0.5 and 1.25.

In general, a current turbine energy conversion system includes an axial flow current turbine 100 that includes stator vanes 108a and impeller or rotor blades 112 and that is surrounded by an aerodynamically contoured turbine shroud 102 that incorporates mixing elements 120a in its terminus region or end portion and a separate ejector shroud 128 overlapping, but aft, of the turbine shroud 102. The ejector shroud 128 can also incorporate advanced mixing elements, such as for example mixer lobes 119 or mixer slots, in its terminus region. A ring 118 of mixer features such as lobes or slots 119 located at the terminus 117 of the ejector shroud 128 can be thought of as a mixer/ejector pump that provides the means for consistently exceeding the Betz limit for operational efficiency of the current and tidal turbine system 100.

FIG. 2A shows a turbine stage 104 that includes a rotor assembly 110 that is rotatably mounted on a center body 103, surrounded by turbine shroud 102 with embedded mixer elements 120a having trailing edges inserted slightly in the entrance plane of ejector shroud 128. The turbine stage 104 and ejector shroud 128 are structurally connected to the turbine shroud 102, which itself is the principal load carrying member.

The length of the turbine shroud 102 can in some implementations be equal to or less than the turbine shroud's 102 maximum outer diameter. The length of the ejector shroud 128 can in some implementations be equal to or less than the ejector shroud's maximum outer diameter. The exterior surface of the center body 103 can be aerodynamically or hydrodynamically contoured to minimize the effects of flow separation downstream of the current turbine system 100. The center body 103 can be longer or shorter than the turbine shroud 102 or the ejector shroud 128, or their combined lengths.

The cross sectional area of the turbine shroud inlet 105 and the turbine shroud terminus 115 can be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the rotor assembly 110 and to otherwise vary smoothly from their respective entrance planes to their exit planes. The turbine shroud 102 and the ejector shroud 128 external surfaces are aerodynamically or hydrodynamically shaped to assist guiding the flow into the turbine shroud inlet 105, eliminating flow separation from their surfaces, and delivering smooth flow into the ejector shroud entrance 129. The ejector 128 entrance area, which may be noncircular in shape, is larger than the cross sectional area of the turbine shroud terminus 115 including the mixer features 118 at the turbine shroud terminus. The cross-sectional area at the ejector shroud terminus 117 can also be noncircular in shape.

Figure 4A:
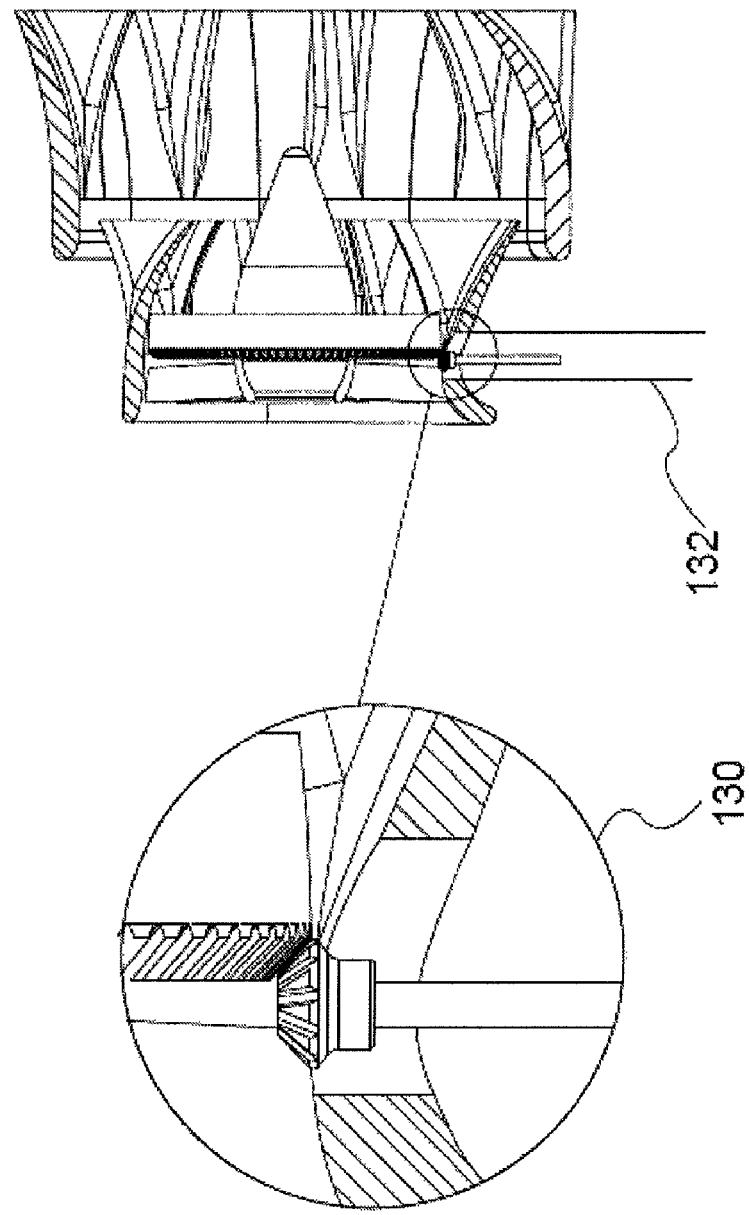

An example of a power take-off 130 as shown in FIG. 4A and FIG. 4B can take the form of a wheel-like structure mechanically linked at an outer or inner rim of the rotor assembly 110 to a power generator (not shown) below or above the rotor assembly 110. A vertical support shaft 132 with a rotatable coupling at 134 as shown in FIG. 4A and FIG. 5A can rotatably support the current turbine system 100 and can be located forward of the center-of-pressure location experienced by the current turbine system 100 for self-aligning of the current turbine system when submerged in a flowing current. Self-moving vertical rudders 136 and generally horizontal wings 135 (see FIG. 7), affixed to upper and lower surfaces of the turbine and/or the ejector shrouds 102 and 128 respectively, to stabilize alignment directions with different current and tidal streams and provide steering during vertical movements.

A current turbine system 100, can be structurally supported by other systems as shown for example in FIG. 5A, FIG. 5B, FIG. 5C, and FIG. 5D, such as for example a pole 133, a fixed foundation 137, tethers 138, or a water borne craft 139 such as a barge or float.

Variable mixer element geometries can be used and optimized to extract maximum energy from the bypass air flow as shown in FIG. 6. The mixer elements 140 can be asymmetric in relation to a plane passing through the rotor assembly 110 axis of rotation as FIG. 6 shows.

Figure 7B:
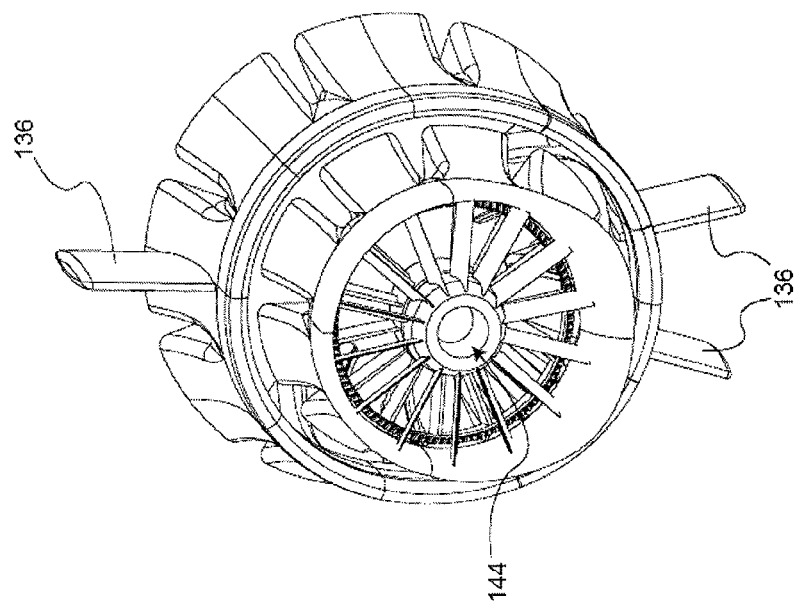
FIGS. 7A, 7B, 7C, and 7D are schematic diagrams illustrating alternate implementation of a current turbine system with two optional pivoting rudders and wing for current flow alignment and movement, flow blockage/control doors and stators that can rotate into or out of a plane passing through the door or stator and the center body of the current turbine system.
Figure 7A:
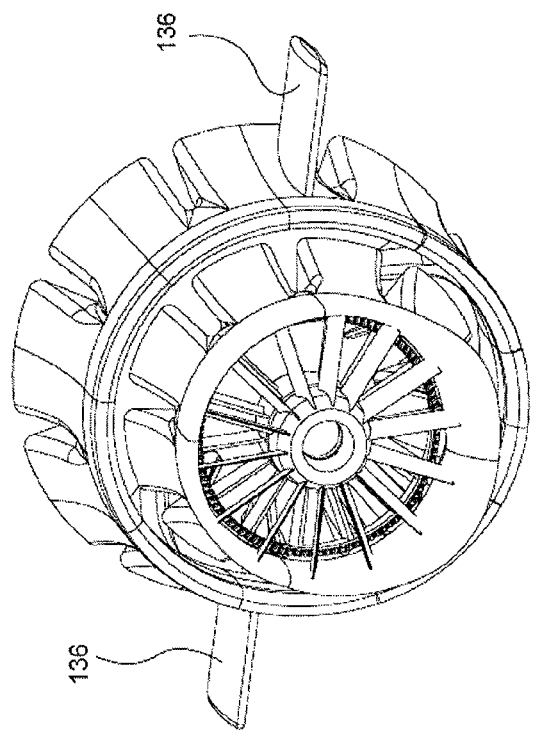
Figures 7C, 7D:
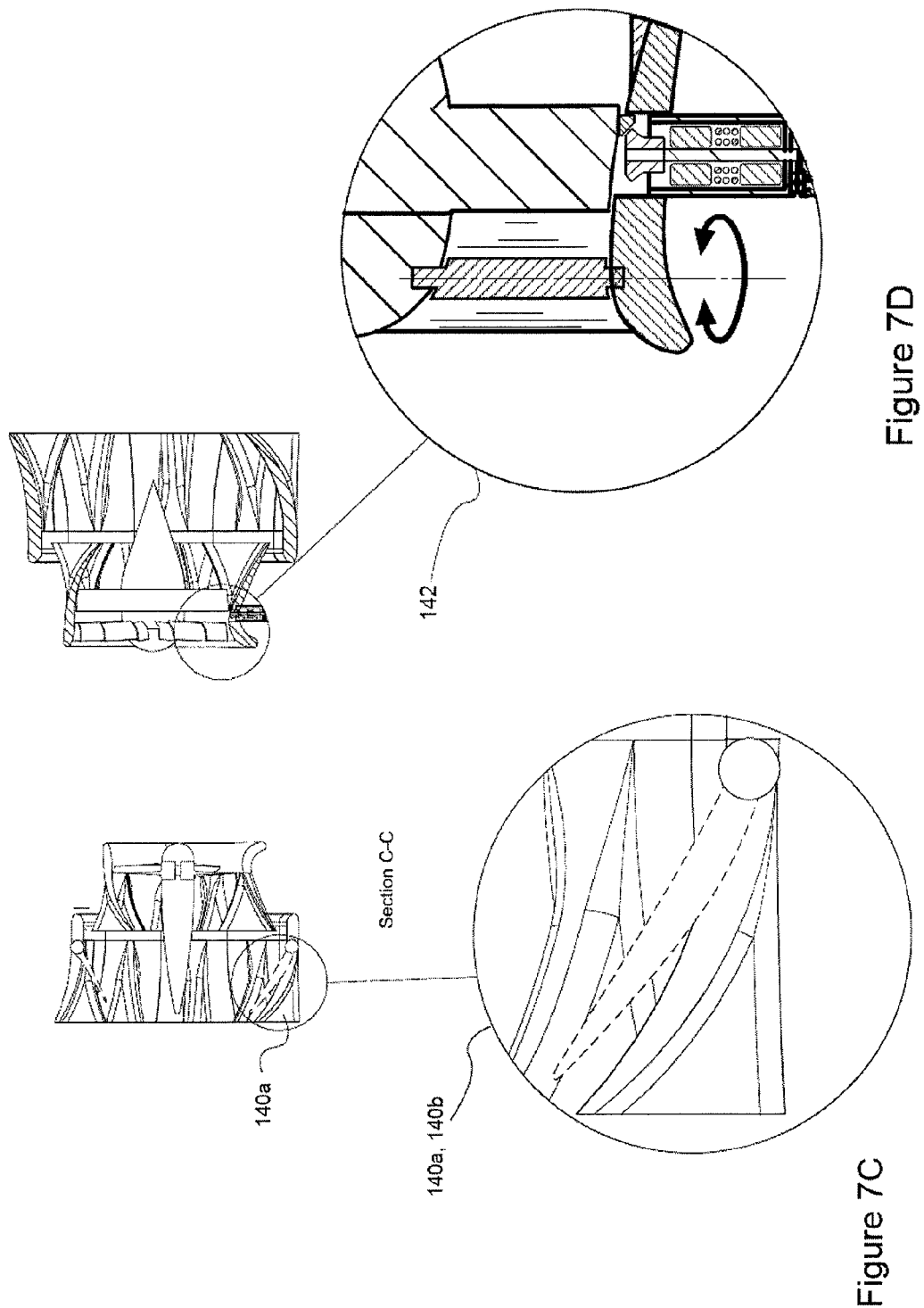

FIG. 7 show control rudders and wings 135 and 136, and optional flow blockage doors 140a, 140b. They can be rotated via linkage (not shown) into the flow stream to reduce or stop flow through the turbine 100 when damage, to the generator or other components, due to high flow velocity is possible. FIG. 7D presents another optional variation of a current turbine system 100. The stator vanes' exit-angle incidence can be mechanically varied 142, in situ, for example by pivoting the stator vanes to accommodate variations in the fluid stream velocity so as to assure minimum residual swirl in the flow exiting the rotor.

Figure 8B:
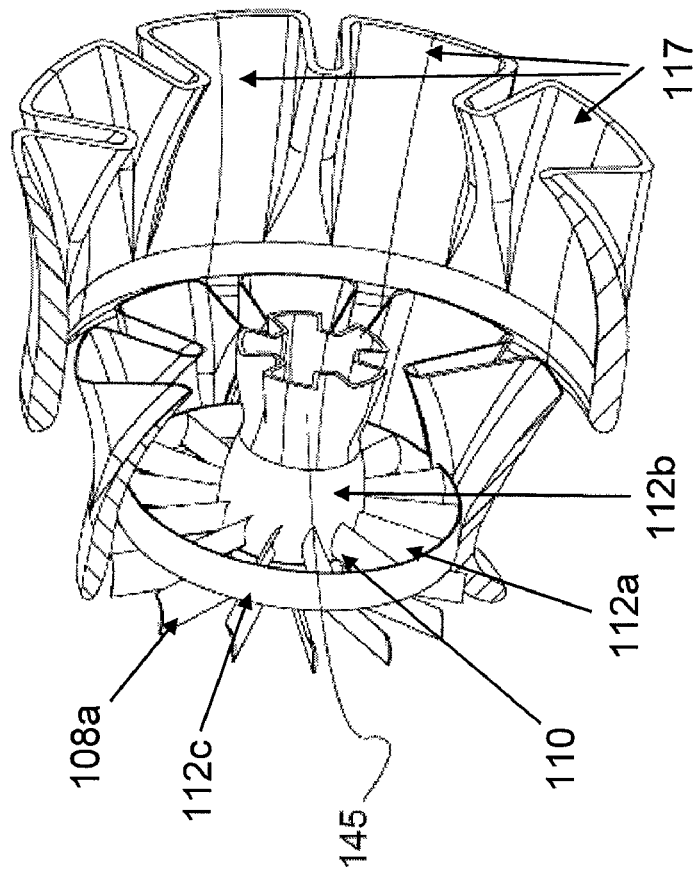
FIGS. 8A, 8B, and 8C are schematic diagrams illustrating alternate implementations of a current turbine system with an open passageway center body having lobe mixers and ejectors with slot mixers.
Figure 8A:
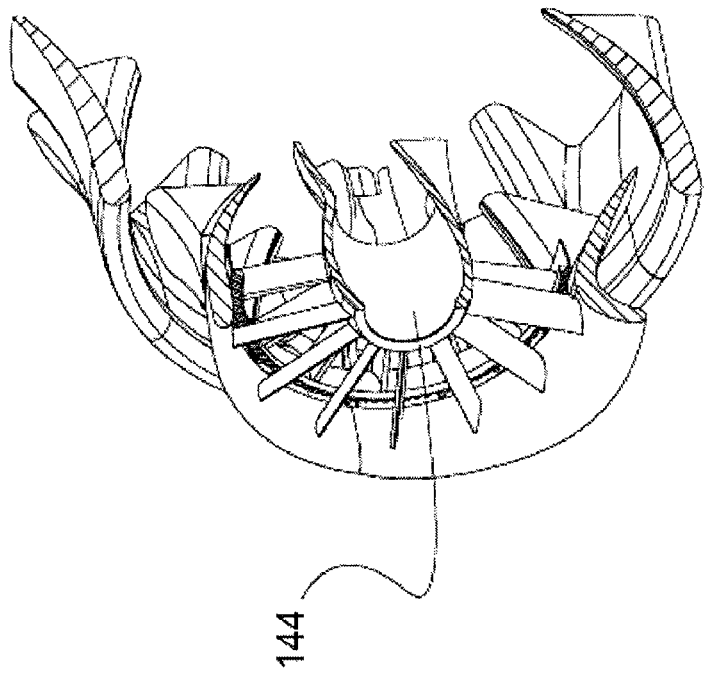
Figure 8C:
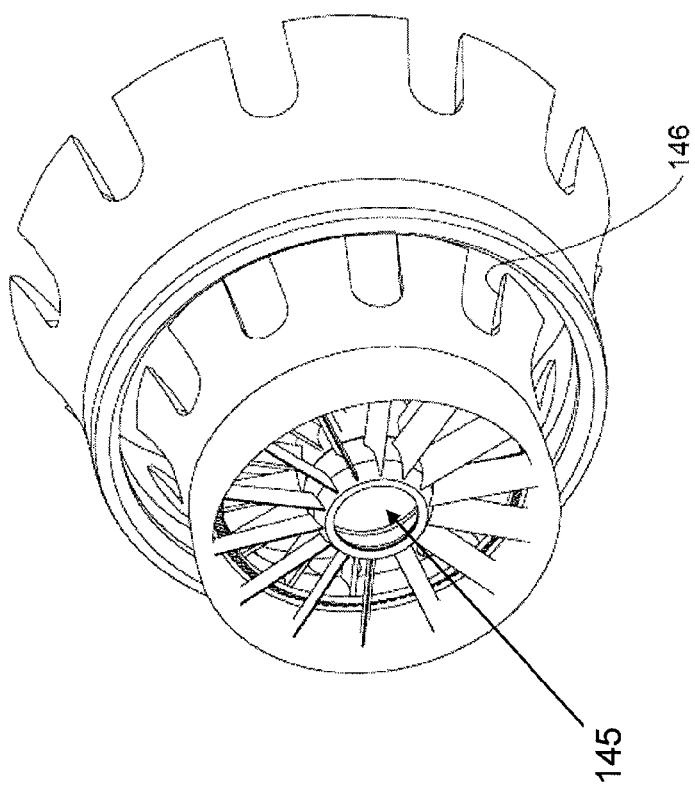
Figure 9B:
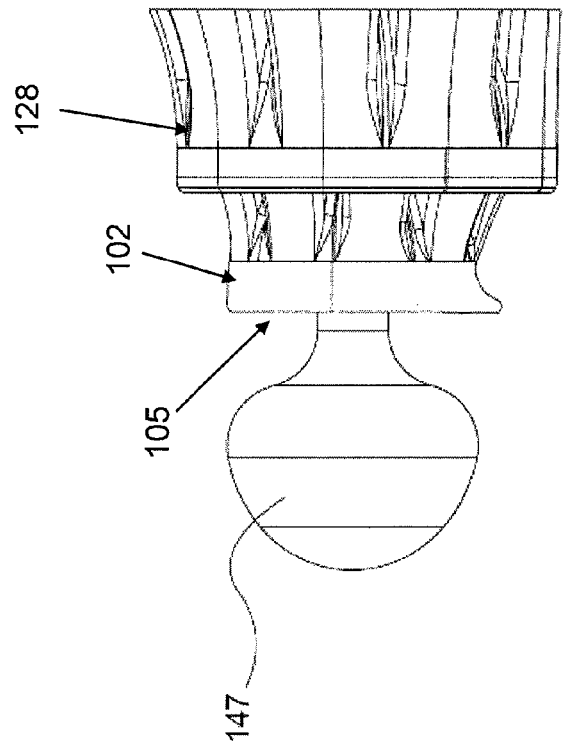
FIGS. 9A, 9B, 9C, and 9D are schematic diagrams illustrating alternate implementations of a current turbine system with an inlet debris blocker system.
Figure 9A:
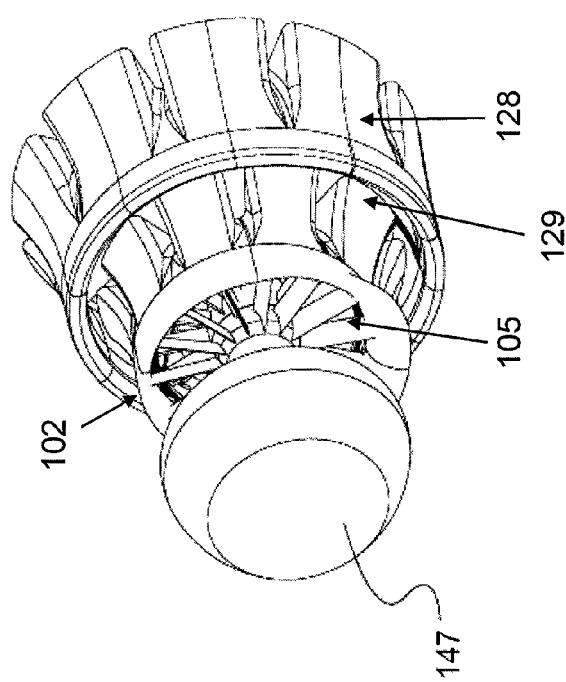
Figure 9C:
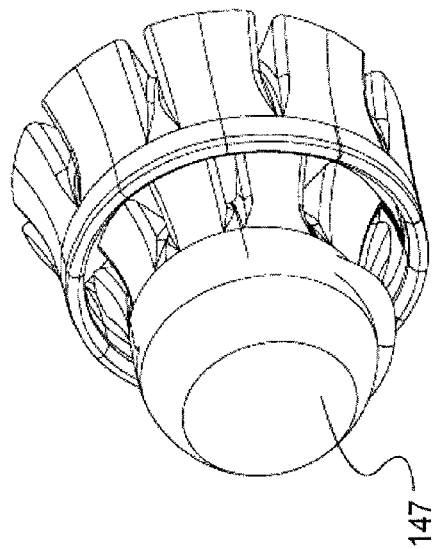
Figure 9D:
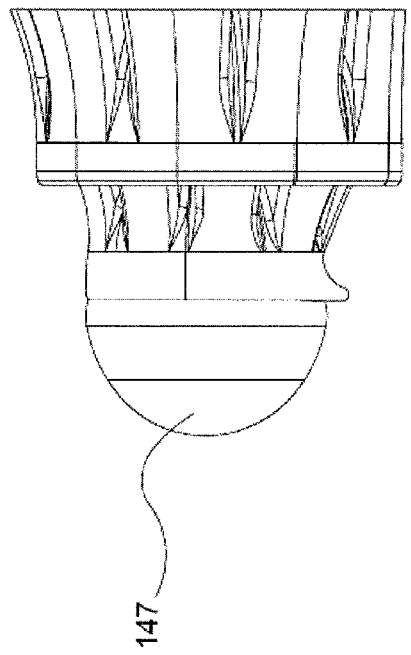

Additional alternative variations can include an open passageway center body 144 as shown in FIG. 8A and FIG. 8B that can include center body mixer elements 145; slot type mixers 146 as shown in FIG. 8C; a center body that includes a debris deflectors 147 as shown in FIGS. 9A, 9B, 9C and 9D; and multiple ejector shrouds 148 as shown in FIG. 10A and FIG. 10B.

Figure 11:
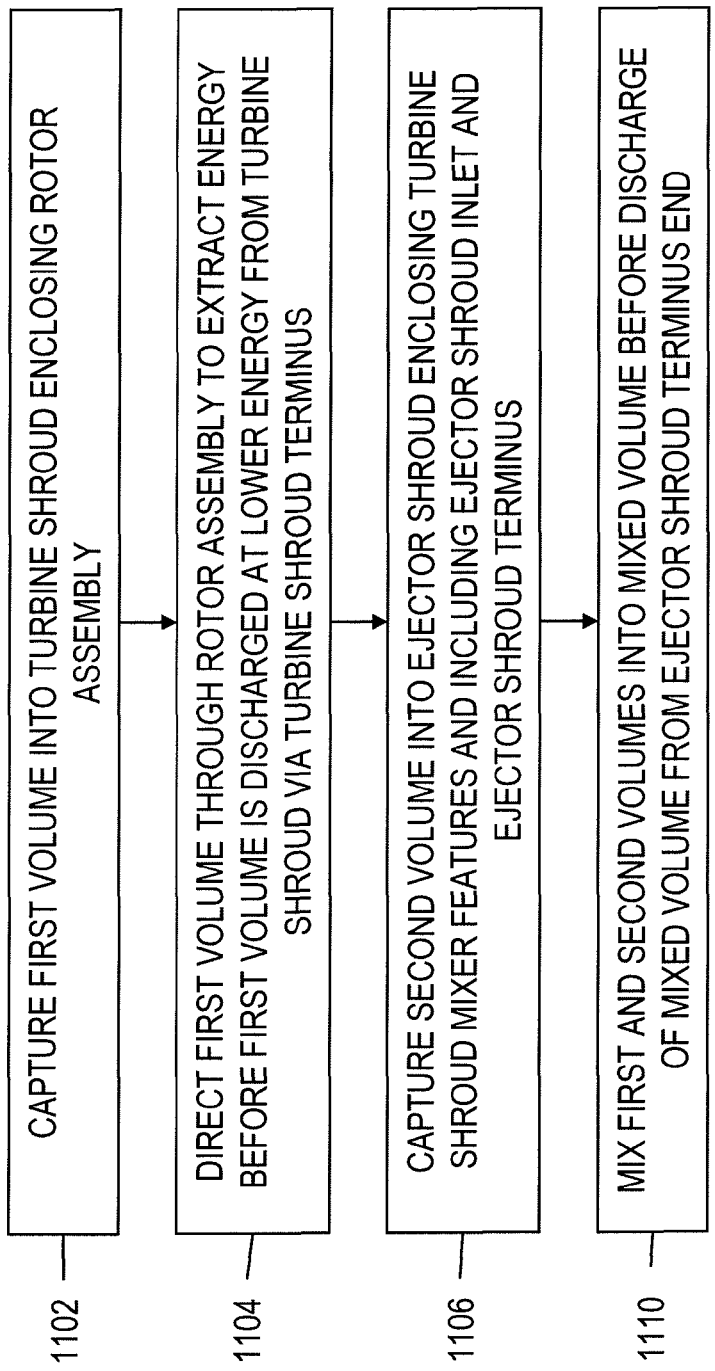
FIG. 11 is a process flow chart illustrating a method according to an implementation of the instant subject matter.

FIG. 11 is a process flow chart illustrating a method according to an implementation of the instant subject matter. At 1102 a first volume of water is captured into a turbine shroud having a turbine shroud inner volume within which at least a portion of a rotor assembly is disposed. The turbine shroud includes a turbine shroud inlet disposed nearer the inlet end than the rotor assembly and a turbine shroud terminus disposed nearer the outlet end than the rotor assembly. The turbine shroud terminus includes a plurality of turbine shroud mixer elements. At 1104, the first volume of water is directed through the rotor assembly such that the rotor assembly rotates and extracts energy from the first volume of water before the first volume of water at a lower energy is discharged from the turbine shroud via the turbine shroud terminus. At 1106, a second volume of the water is captured into an ejector shroud having a ejector shroud inner volume within which at least a portion of the turbine shroud is disposed. The ejector shroud includes an ejector shroud inlet and an ejector shroud terminus that extends in the current flow direction beyond the turbine shroud mixer elements. At 1110, the first and the second volumes are combined or mixed into a mixed volume before discharge of the mixed volume from the ejector shroud terminus. Other structural features as described above can be included in the structure employed in methods according to the instant subject matter.

The implementations set forth in the foregoing description do not represent all implementations consistent with the instant subject matter. Instead, they are merely some examples consistent with aspects related to the described subject matter. Wherever possible, the same reference numbers will be used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments or implementations may be within the scope of the following claims.

What is claimed is:

1. A turbine system for extracting energy from water traveling relative to the turbine system in an incoming current flow direction, the turbine system having an inlet end adapted to be directed into the incoming current flow direction and an outlet end opposite the inlet end, the water having a non-uniform flow velocity distribution across the inlet end of the turbine system, the turbine system comprising:
    a rotor assembly that is axially symmetric about an axis of rotation, the rotor assembly having an upstream rotor face oriented toward the inlet end;
    a turbine shroud having a turbine shroud inner volume within which at least a portion of the rotor assembly is disposed, the turbine shroud comprising a turbine shroud inlet disposed nearer the inlet end than the upstream rotor face and a turbine shroud terminus disposed nearer the outlet end than the rotor assembly, the turbine shroud terminus comprising a plurality of turbine shroud mixer elements, the turbine shroud inlet adapted to direct a first volume of water moving in the incoming current flow direction to the rotor assembly such that the first volume of water causes the rotor assembly to spin and to extract energy from the first volume of water before the first volume of water at a lower energy is discharged from the turbine shroud via the turbine shroud terminus; and
    an ejector shroud disposed adjacent to the turbine shroud, the ejector shroud comprising an ejector shroud inlet and an ejector shroud terminus, the ejector shroud inlet having an asymmetrical cross-section along a plane passing through and perpendicular to the axis of rotation such that the ejector shroud inlet has a greater cross-sectional area on a lower velocity portion of the plane passing through the axis of rotation than on a higher velocity portion of the plane passing through the axis of rotation, the ejector shroud terminus extending in the incoming current flow direction beyond the turbine shroud mixer elements.

2. A turbine system as in claim 1, wherein the ejector shroud has an ejector shroud inner volume, wherein the ejector shroud inlet is adapted to direct a second volume of water moving in the incoming current flow direction into the ejector shroud inner volume, the ejector shroud inner volume comprising a plurality of ejector shroud mixer elements that cause the first volume of water to mix with the second volume of water before exiting through the ejector shroud terminus.

3. A turbine system as in claim 2, wherein the turbine shroud and the ejector shroud shapes minimize a velocity gradient presented to the upstream rotor face, maximize the first volume of water, and maximize mixing of the first and the second volumes before discharge from the ejector shroud terminus, the velocity gradient being measured along the upstream rotor face.

4. A turbine system as in claim 1, further comprising a center body about which the rotor assembly rotates.

5. A turbine system as in claim 4, wherein the turbine shroud further comprises a stator assembly comprising stator vanes arrayed axially about the center body.

6. A turbine system as in claim 5, wherein the stator vanes are rotatable to adjust the first volume of water by increasing or decreasing an open flow area presented to the incoming current flow direction.

7. A turbine system as in claim 4, further comprising a deflector positioned ahead of the center body and being shaped to inertially separate suspended debris and/or aquatic debris from the first volume of water prior to the first volume of water encountering the upstream rotor face.

8. A turbine system as in claim 4, wherein the center body comprises a downstream end projecting from the center body toward the turbine shroud terminus, the downstream end comprising one or more mixer elements.

9. A turbine system as in claim 4, wherein the center body comprises a central hollow cavity.

10. A turbine system as in claim 9, wherein the central hollow cavity is adapted to allow suspended aquatic debris and/or aquatic life to pass through the center body toward the turbine shroud terminus without encountering the rotor assembly.

11. A turbine system as in claim 9, wherein the central hollow cavity passes high energy bypass flow to the ejector shroud to enhance mixing performance in the ejector shroud.

12. A turbine system as in claim 1, wherein the turbine shroud inlet has an asymmetrical cross-section along the plane passing through the axis of rotation such that the turbine shroud inlet has a greater cross-sectional area on the lower velocity portion of the plane passing through the axis of rotation than on the higher velocity portion of the plane passing through the axis of rotation.

13. A turbine system as in claim 1, wherein the turbine shroud mixer elements comprise one or more of mixer lobes and mixer slots.

14. A turbine system as in claim 1, wherein the rotor assembly comprises a rotor hub, an outer rotor ring, and a first plurality of radially oriented rotor blades disposed between the hub and the outer rotor ring.

15. A turbine system as in claim 1, wherein the ejector shroud terminus comprises a second plurality of ejector shroud mixer elements.

16. A turbine system as in claim 15, wherein the ejector shroud mixer elements comprise one or more of mixer lobes and mixer slots.

17. A turbine system as in claim 15, wherein the plurality of ejector shroud mixer elements are asymmetrical along the plane passing through the axis of rotation, and wherein one or more of the ejector shroud mixer elements on the lower velocity portion of the plane passing through the axis of rotation are larger than one or more of the ejector shroud mixer elements on the higher velocity portion of the plane passing through the axis of rotation.

18. A turbine system as in claim 1, wherein the plurality of turbine shroud mixer elements are asymmetrical along the plane passing through the axis of rotation, and wherein one or more of the turbine shroud mixer elements on the lower velocity portion of the plane passing through the axis of rotation are larger than one or more of the turbine shroud mixer elements on the higher velocity portion of the plane passing through the axis of rotation.

19. A turbine system as in claim 2, further comprising a second ejector shroud disposed adjacent to the ejector shroud, the second ejector shroud comprising a second ejector shroud inlet and a second ejector shroud terminus, the second ejector shroud inlet having an asymmetrical cross-section along the plane passing through the axis of rotation such that the second ejector shroud inlet has a greater cross-sectional area on the lower velocity portion of the plane passing through the axis of rotation than on the higher velocity portion of the plane passing through the axis of rotation, the second ejector shroud terminus extending in the incoming current flow direction beyond the ejector shroud mixer elements.

20. A turbine system as in claim 1, wherein the ejector shroud and turbine shroud mixer elements comprise a mixer/ejector pump which enhances a rate at which the first volume of water flows through the turbine shroud and across the rotor assembly.

21. A turbine system as in claim 1, wherein the turbine shroud inlet comprises one or more movable door elements that are operable to increase or reduce the first volume of water flowing through the rotor assembly.

22. A method of extracting energy from water traveling relative to a turbine system in an incoming current flow direction, the turbine system having an inlet end adapted to be directed into the incoming current flow direction and an outlet end opposite the inlet end, the water having a non-uniform flow velocity distribution across the inlet end of the turbine system, the method comprising:
　　capturing a first volume of the water into a turbine shroud having a turbine shroud inner volume within which at least a portion of a rotor assembly is disposed, the rotor assembly being axially symmetric about an axis of rotation, the turbine shroud comprising a turbine shroud inlet disposed nearer the inlet end than the rotor assembly and a turbine shroud terminus disposed nearer the outlet end than the rotor assembly, the turbine shroud terminus comprising a plurality of turbine shroud mixer elements;
　　directing the first volume of water through the rotor assembly such that the rotor assembly extracts energy from the first volume of water before the first volume of water at a lower energy is discharged from the turbine shroud via the turbine shroud terminus;
　　capturing a second volume of the water into an ejector shroud disposed adjacent to the turbine shroud, the ejector shroud comprising an ejector shroud inlet and an ejector shroud terminus, the ejector shroud comprising an ejector shroud inlet and an ejector shroud terminus, the ejector shroud inlet having an asymmetrical cross-section along a plane passing through and perpendicular to the axis of rotation such that the ejector shroud inlet has a greater cross-sectional area on a lower velocity portion of the plane passing through the axis of rotation than on a higher velocity portion of the plane passing through the axis of rotation, the ejector shroud terminus extending in the incoming current flow direction beyond the turbine shroud mixer elements; and
　　mixing the first and the second volumes of water into a mixed volume before discharge of the mixed volume from the ejector shroud terminus.

23. A method as in claim 22, wherein the ejector shroud terminus comprises a plurality of ejector shroud mixer elements that are asymmetrical along the plane passing through the axis of rotation such that at least one of the ejector shroud mixer elements on a lower velocity portion of the plane passing through the axis of rotation is larger than at least one of the ejector shroud mixer elements on a higher velocity portion of the plane passing through the axis of rotation.

24. A turbine system for extracting energy from water traveling relative to the turbine system in an incoming current flow direction, the turbine system having an inlet end adapted to be directed into the incoming current flow direction and an outlet end opposite the inlet end, the water having a non-uniform flow velocity distribution across the inlet end of the turbine system, the turbine system comprising:
　　a rotor assembly that is axially symmetric about an axis of rotation, the rotor assembly having an upstream rotor face oriented toward the inlet end;
　　a turbine shroud having a turbine shroud inner volume within which at least a portion of the rotor assembly is disposed, the turbine shroud comprising a turbine shroud inlet disposed nearer the inlet end than the upstream rotor face and a turbine shroud terminus disposed nearer the outlet end than the rotor assembly, the turbine shroud terminus comprising a plurality of turbine shroud mixer elements, the turbine shroud mixer elements being asymmetric along a plane passing through and perpendicular to the axis of rotation such that at least one of the turbine shroud mixer elements on a lower velocity portion of the plane passing through the axis of rotation is larger than at least one of the turbine shroud mixer elements on a higher velocity portion of the plane passing through the axis of rotation, the turbine shroud inlet adapted to direct a first volume of water moving in the incoming current flow direction to the rotor assembly such that the first volume of water causes the rotor assembly to spin and to extract energy from the first volume of water before the first volume of water at a lower energy is discharged from the turbine shroud via the turbine shroud terminus; and
　　an ejector shroud disposed adjacent to the turbine shroud, the ejector shroud comprising an ejector shroud inlet and an ejector shroud terminus extending in the incoming current flow direction beyond the turbine shroud mixer elements.

25. A system as in claim 24, wherein the ejector shroud terminus comprises a plurality of ejector shroud mixer elements that are asymmetric along the plane passing through the axis of rotation such that at least one of the ejector shroud mixer elements on the lower velocity portion of the plane passing through the axis of rotation is larger than at least one of the ejector shroud mixer elements on the higher velocity portion of the plane passing through the axis of rotation.

* * * * *